United States Patent
Wang

(10) Patent No.: US 10,492,149 B2
(45) Date of Patent: Nov. 26, 2019

(54) TRANSMIT POWER CONTROL METHOD AND APPARATUS

(71) Applicant: HUAWEI TECHNOLOGIES CO., LTD., Shenzhen, Guangdong (CN)

(72) Inventor: Tongbo Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/761,854

(22) PCT Filed: Sep. 21, 2015

(86) PCT No.: PCT/CN2015/090086
§ 371 (c)(1),
(2) Date: Mar. 21, 2018

(87) PCT Pub. No.: WO2017/049427
PCT Pub. Date: Mar. 30, 2017

(65) Prior Publication Data
US 2018/0270765 A1 Sep. 20, 2018

(51) Int. Cl.
H04B 17/00 (2015.01)
H04W 52/24 (2009.01)
(Continued)

(52) U.S. Cl.
CPC ........... *H04W 52/245* (2013.01); *H04L 43/12* (2013.01); *H04W 52/02* (2013.01); *H04W 52/20* (2013.01);
(Continued)

(58) Field of Classification Search
CPC ...... H04B 17/318; H04B 3/04; H04B 17/101; H04W 72/085; H04W 92/18;
(Continued)

(56) References Cited

U.S. PATENT DOCUMENTS

2013/0039212 A1* 2/2013 Li .................... H04W 52/0245
370/253
2013/0116001 A1 5/2013 Wang
(Continued)

FOREIGN PATENT DOCUMENTS

CN 101765195 A 6/2010
CN 101951671 A 1/2011
(Continued)

OTHER PUBLICATIONS

Extended European Search Report issued in European Application No. 15904315.7 dated Jul. 5, 2018, 10 pages.
(Continued)

Primary Examiner — Tu X Nguyen
(74) Attorney, Agent, or Firm — Fish & Richardson P.C.

(57) ABSTRACT

The present disclosure relates to a transmit power control method and apparatus applied to a mobile terminal. One example method includes monitoring whether the mobile terminal has accessed a wireless access point AP. When the mobile terminal has accessed the AP, a received signal strength indicator (RSSI) of a signal that is sent by the AP and received by the mobile terminal is detected. A data sending rate at which the mobile terminal sends data to the AP is detected, and a transmit power relationship table is searched for a preset transmit power corresponding to both the RSSI and the data sending rate. A current transmit power of the mobile terminal to the first target transmit power is adjusted such that the mobile terminal sends data to the AP according to the first target transmit power. This method can reduce an unwanted power loss of the mobile terminal.

7 Claims, 14 Drawing Sheets

(51) Int. Cl.
*H04W 52/02* (2009.01)
*H04W 52/20* (2009.01)
*H04W 52/26* (2009.01)
*H04L 12/26* (2006.01)
*H04W 52/14* (2009.01)

(52) U.S. Cl.
CPC ........ *H04W 52/267* (2013.01); *H04W 52/146* (2013.01)

(58) Field of Classification Search
CPC ... H04W 52/146; H04W 52/02; H04W 52/10; H04W 52/34
USPC .................. 455/134, 135, 574, 115.3, 127.5
See application file for complete search history.

(56) References Cited

U.S. PATENT DOCUMENTS

| | | | |
|---|---|---|---|
| 2015/0098377 A1* | 4/2015 | Amini | ................... H04W 76/10 370/311 |
| 2016/0157173 A1 | 6/2016 | Shen | |

FOREIGN PATENT DOCUMENTS

| | | |
|---|---|---|
| CN | 101977097 A | 2/2011 |
| CN | 103415066 A | 11/2013 |
| CN | 103546952 A | 1/2014 |
| CN | 104301982 A | 1/2015 |
| CN | 104717726 A | 6/2015 |
| JP | 2006165742 A | 6/2006 |
| WO | 2007104341 A1 | 9/2007 |
| WO | 2015119655 A1 | 8/2015 |

OTHER PUBLICATIONS

International Search Report issued in International Application No. PCT/CN2015/090086 dated Jul. 1, 2016, 13 pages.

Japanese Office Action issued in Japanese Application No. 2018-51917 dated Jan. 28, 2019, 9 pages.

* cited by examiner

TRANSMIT POWER CONTROL METHOD AND APPARATUS

CROSS-REFERENCE TO RELATED APPLICATIONS

This application is a National Stage of International Application No. PCT/CN2015/090086, filed on Sep. 21, 2015, which is hereby incorporated by reference in its entirety.

TECHNICAL FIELD

The present invention relates to the field of communications technologies, and in particular, to a transmit power control method and apparatus.

BACKGROUND

As technologies keep developing, users can be provided with more types of mobile terminal products, for example, smartphones, tablet computers, and e-books. These mobile terminal products almost all have a wireless network Wi-Fi access function. This provides great convenience for users to surf the Internet by using mobile terminals.

However, when a user accesses an AP (Wireless Access Point, wireless access point) to surf the Internet by using a mobile terminal, a position of the mobile terminal may change as a position of the user changes. When the mobile terminal is closer to the AP, a signal of the AP received by the mobile terminal is stronger. When the mobile terminal is farther away from the AP, a signal of the AP received by the mobile terminal is weaker.

Currently, regardless of whether a mobile terminal accesses an AP that has a weaker signal or an AP that has a stronger signal, a Wi-Fi module of the mobile terminal operates at a fixed transmit power. For example, when a mobile terminal accesses an AP that has a relatively weak signal, to obtain good quality of data transmitted between the mobile terminal and the AP as much as possible, a Wi-Fi module of the mobile terminal is usually configured to operate always at a maximum transmit power. However, when the signal of the AP accessed by the mobile terminal becomes stronger, the Wi-Fi module of the mobile terminal still operates always at the maximum transmit power. This inevitably increases power consumption of the mobile terminal. In addition, because a battery capacity of the mobile terminal is limited, if the mobile terminal accesses the AP always at the maximum transmit power, battery power is consumed excessively quickly, and therefore a battery life of the mobile terminal is severely affected.

SUMMARY

To overcome the problem existing in the related art, the present invention provides a transmit power control method and apparatus.

According to a first aspect of embodiments of the present invention, a transmit power control method is provided, applied to a mobile terminal, including:

monitoring whether the mobile terminal has accessed a wireless access point AP;

when the mobile terminal has accessed the AP, detecting a received signal strength indicator RSSI (Received Signal Strength Indication, received signal strength indicator) of a signal that is sent by the AP and received by the mobile terminal, and detecting a data sending rate at which the mobile terminal sends data to the AP;

obtaining a pre-established transmit power relationship table, where in the transmit power relationship table, in the case of a same RSSI, each data sending rate is corresponding to one preset transmit power;

searching the transmit power relationship table for a preset transmit power corresponding to both the RSSI and the data sending rate, and using the preset transmit power as a first target transmit power; and adjusting a current transmit power of the mobile terminal to the first target transmit power, so that the mobile terminal sends data to the AP according to the first target transmit power.

With reference to the first aspect, in a first possible implementation of the first aspect, the method further includes:

obtaining a first packet error rate generated when the mobile terminal sends data to the AP at the first target transmit power;

determining whether the first packet error rate is greater than a preset upper threshold;

if the first packet error rate is greater than the preset upper threshold, determining a preset transmit power corresponding to both the RSSI and the data sending rate, and using the preset transmit power as a second target transmit power; and adjusting the current transmit power of the mobile terminal from the first target transmit power to the second target transmit power, so that the mobile terminal sends data to the AP according to the second target transmit power.

With reference to the first possible implementation of the first aspect, in a second possible implementation of the first aspect, the method further includes:

updating the transmit power relationship table.

With the first possible implementation of the first aspect, in a third possible implementation of the first aspect, the determining a preset transmit power corresponding to both the RSSI and the data sending rate, and using the preset transmit power as a second target transmit power includes:

obtaining a maximum transmit power when the mobile terminal sends data to the AP according to the RSSI and the data sending rate;

adjusting the current transmit power of the mobile terminal to the maximum transmit power, and sending a power probe frame to the AP;

obtaining a second packet error rate generated when the terminal sends the power probe frame to the AP at the current transmit power;

determining whether the second packet error rate is less than a preset attenuation trigger threshold; and when the second packet error rate is less than the preset attenuation trigger threshold, subtracting a preset power change step value from the current transmit power of the mobile terminal, and performing the step of obtaining a second packet error rate generated when the terminal sends the power probe frame to the AP at the current transmit power; or when the second packet error rate is not less than the preset attenuation trigger threshold, determining the current transmit power of the mobile terminal as the preset transmit power corresponding to both the RSSI and the data sending rate, and using the preset transmit power as the second target transmit power.

With reference to the third possible implementation of the first aspect, in a fourth possible implementation of the first aspect, the method further includes:

when the second packet error rate is not less than the preset attenuation trigger threshold, determining whether the second packet error rate is less than a preset attenuation stop threshold; and when the second packet error rate is not less than the preset attenuation stop threshold, adding the preset power change step value to the current transmit power of the mobile terminal, and using an obtained result as the second target transmit power; or when the second packet error rate is less than the preset attenuation stop threshold, using the current transmit power of the mobile terminal as the second target transmit power.

According to a second aspect of the embodiments of the present invention, a transmit power control method is provided, including:

monitoring whether a mobile terminal has accessed a wireless access point AP;

when the mobile terminal has accessed the AP, detecting a received signal strength indicator RSSI of a signal that is sent by the AP and received by the mobile terminal, and detecting a data sending rate at which the mobile terminal sends data to the AP;

obtaining a maximum transmit power when the mobile terminal sends data to the AP according to the RSSI and the data sending rate;

controlling the mobile terminal to send a power probe frame to the AP at the maximum transmit power;

obtaining a third packet error rate generated when the terminal sends the power probe frame to the AP at the current transmit power;

determining whether the third packet error rate is less than a preset attenuation trigger threshold;

when the third packet error rate is less than the preset attenuation trigger threshold, subtracting a preset power change step value from the current transmit power of the mobile terminal, and performing the step of obtaining a third packet error rate generated when the terminal sends the power probe frame to the AP at the current transmit power; or when the third packet error rate is not less than the preset attenuation trigger threshold, determining the current transmit power of the mobile terminal as a preset transmit power corresponding to both the RSSI and the data sending rate; and saving the RSSI, the data transmission rate, and the corresponding preset transmit power into a transmit power relationship table.

With reference to the second aspect, in a first possible implementation of the second aspect, the method further includes:

when the third packet error rate is not less than the preset attenuation trigger threshold, determining whether the third packet error rate is less than a preset attenuation stop threshold;

when the third packet error rate is not less than the preset attenuation stop threshold, adding the preset power change step value to the current transmit power of the mobile terminal, and determining an obtained result as the preset transmit power corresponding to both the RSSI and the data sending rate; or when the third packet error rate is less than the preset attenuation stop threshold, determining the current transmit power of the mobile terminal as the preset transmit power corresponding to both the RSSI and the data sending rate; and saving the RSSI, the data transmission rate, and the corresponding preset transmit power into the transmit power relationship table.

According to a third aspect of the embodiments of the present invention, a transmit power control method is provided, including:

monitoring whether a mobile terminal has accessed a wireless access point AP;

when the mobile terminal has accessed the AP, detecting a received signal strength indicator RSSI of a signal that is sent by the AP and received by the mobile terminal, and detecting a data sending rate at which the mobile terminal sends data to the AP;

obtaining a maximum transmit power when the mobile terminal sends data to the AP according to the RSSI and the data sending rate;

controlling the mobile terminal to send data to the AP at the maximum transmit power;

obtaining a fourth packet error rate generated when the terminal sends a power probe frame to the AP at the current transmit power;

determining whether the fourth packet error rate is less than a preset attenuation trigger threshold;

when the fourth packet error rate is less than the preset attenuation trigger threshold, subtracting a preset power change step value from the current transmit power of the mobile terminal, and performing the step of obtaining a fourth packet error rate generated when the terminal sends a power probe frame to the AP at the current transmit power; or when the fourth packet error rate is not less than the preset attenuation trigger threshold, determining the current transmit power of the mobile terminal as a preset transmit power corresponding to both the RSSI and the data sending rate, and using the preset transmit power as a third target transmit power; and adjusting the current transmit power of the mobile terminal to the third target transmit power, so that the mobile terminal sends data to the AP according to the third target transmit power.

With reference to the third aspect, in a first possible implementation of the third aspect, the method further includes:

when the fourth packet error rate is not less than the preset attenuation trigger threshold, determining whether the fourth packet error rate is less than a preset attenuation stop threshold;

when the fourth packet error rate is not less than the preset attenuation stop threshold, adding the preset power change step value to the current transmit power of the mobile terminal, and using an obtained result as the third target transmit power; or when the fourth packet error rate is less than the preset attenuation stop threshold, using the current transmit power of the mobile terminal as the third target transmit power; and adjusting the current transmit power of the mobile terminal to the third target transmit power, so that the mobile terminal sends data to the AP according to the third target transmit power.

According to a fourth aspect of the embodiments of the present invention, a transmit power control apparatus is provided, applied to a mobile terminal, including:

a first monitoring unit, configured to monitor whether the mobile terminal has accessed a wireless access point AP;

a first RSSI detection unit, configured to: when the mobile terminal has accessed the AP, detect a received signal strength indicator RSSI of a signal that is sent by the AP and received by the mobile terminal;

a first data sending rate detection unit, configured to detect a data sending rate at which the mobile terminal sends data to the AP;

a relationship table obtaining unit, configured to obtain a pre-established transmit power relationship table, where in the transmit power relationship table, in the case of a same RSSI, each data sending rate is corresponding to one preset transmit power;

a searching unit, configured to: search the transmit power relationship table for a preset transmit power corresponding to both the RSSI and the data sending rate, and use the preset transmit power as a first target transmit power; and a first transmit power adjustment unit, configured to adjust a current transmit power of the mobile terminal to the first target transmit power.

With reference to the fourth aspect, in a first possible implementation of the fourth aspect, the apparatus further includes:

a first packet error rate obtaining unit, configured to obtain a first packet error rate generated when the mobile terminal sends data to the AP at the first target transmit power;

a first packet error rate determining unit, configured to determine whether the first packet error rate is greater than a preset upper threshold;

a preset transmit power calculation unit, configured to: when the first packet error rate is greater than the preset upper threshold, determine a preset transmit power corresponding to both the RSSI and the data sending rate, and use the preset transmit power as a second target transmit power; and a second transmit power adjustment unit, configured to adjust the current transmit power of the mobile terminal from the first target transmit power to the second target transmit power, so that the mobile terminal sends data to the AP according to the second target transmit power.

With reference to the first possible implementation of the fourth aspect, in a second possible implementation of the fourth aspect, the apparatus further includes:

an updating unit, configured to update the transmit power relationship table.

With reference to the first possible implementation of the fourth aspect, in a third possible implementation of the fourth aspect, the preset transmit power calculation unit includes:

a maximum transmit power obtaining module, configured to obtain a maximum transmit power when the mobile terminal sends data to the AP according to the RSSI and the data sending rate;

a transmit power adjustment module, configured to adjust the current transmit power of the mobile terminal to the maximum transmit power;

a power probe frame sending module, configured to send a power probe frame to the AP;

a second packet error rate obtaining module, configured to obtain a second packet error rate generated when the terminal sends the power probe frame to the AP at the current transmit power;

a second packet error rate determining module, configured to determine whether the second packet error rate is less than a preset attenuation trigger threshold;

a first current transmit power calculation module, configured to: when the second packet error rate is less than the preset attenuation trigger threshold, subtract a preset power change step value from the current transmit power of the mobile terminal; and a preset transmit power determining module, configured to: when the second packet error rate is not less than the preset attenuation trigger threshold, determine the current transmit power of the mobile terminal as the preset transmit power corresponding to both the RSSI and the data sending rate, and use the preset transmit power as the second target transmit power.

With reference to the third possible implementation of the fourth aspect, in a fourth possible implementation of the fourth aspect, the apparatus further includes a second current transmit power calculation module and a second target transmit power determining module, where the second packet error rate determining module is further configured to: when the second packet error rate is not less than the preset attenuation trigger threshold, determine whether the second packet error rate is less than a preset attenuation stop threshold;

the second current transmit power calculation module is configured to: when the second packet error rate is not less than the preset attenuation stop threshold, add the preset power change step value to the current transmit power of the mobile terminal, and use an obtained result as the second target transmit power; and the second target transmit power determining module is configured to: when the second packet error rate is less than the preset attenuation stop threshold, use the current transmit power of the mobile terminal as the second target transmit power.

According to a fifth aspect of the embodiments of the present invention, a transmit power control apparatus is provided, including:

a second monitoring unit, configured to monitor whether a mobile terminal has accessed a wireless access point AP;

a second RSSI detection unit, configured to: when the mobile terminal has accessed the AP, detect a received signal strength indicator RSSI of a signal that is sent by the AP and received by the mobile terminal;

a second data sending rate detection unit, configured to detect a data sending rate at which the mobile terminal sends data to the AP;

a first maximum transmit power obtaining unit, configured to obtain a maximum transmit power when the mobile terminal sends data to the AP according to the RSSI and the data sending rate;

a power probe frame sending unit, configured to control the mobile terminal to send a power probe frame to the AP at the maximum transmit power;

a third packet error rate obtaining unit, configured to obtain a third packet error rate generated when the terminal sends the power probe frame to the AP at the current transmit power;

a third packet error rate determining unit, configured to determine whether the third packet error rate is less than a preset attenuation trigger threshold;

a first current transmit power calculation unit, configured to: when the third packet error rate is less than the preset attenuation trigger threshold, subtract a preset power change step value from the current transmit power of the mobile terminal;

a current transmit power determining unit, configured to: when the third packet error rate is not less than the preset attenuation trigger threshold, determine the current transmit power of the mobile terminal as a preset transmit power corresponding to both the RSSI and the data sending rate; and a first storage unit, configured to save the RSSI, the data transmission rate, and the corresponding preset transmit power into a transmit power relationship table.

With reference to the fifth aspect, in a first possible implementation of the fifth aspect, the apparatus further includes a second current transmit power calculation unit, a first preset transmit power determining unit, and a second storage unit, where the third packet error rate determining unit is further configured to: when the third packet error rate is not less than the preset attenuation trigger threshold, determine whether the third packet error rate is less than a preset attenuation stop threshold;

the second current transmit power calculation unit is configured to: when the third packet error rate is not less than the preset attenuation stop threshold, add the preset power change step value to the current transmit power of the mobile terminal, and determine an obtained result as the preset transmit power corresponding to both the RSSI and the data sending rate;

the first preset transmit power determining unit is configured to: when the third packet error rate is less than the preset attenuation stop threshold, determine the current transmit power of the mobile terminal as the preset transmit power corresponding to both the RSSI and the data sending rate; and the second storage unit is configured to save the RSSI, the data transmission rate, and the corresponding preset transmit power into the transmit power relationship table.

According to a sixth aspect of the embodiments of the present invention, a transmit power control apparatus is provided, including:

a third monitoring unit, configured to monitor whether a mobile terminal has accessed a wireless access point AP;

a third RSSI detection unit, configured to: when the mobile terminal has accessed the AP, detect a received signal strength indicator RSSI of a signal that is sent by the AP and received by the mobile terminal;

a third data sending rate detection unit, configured to detect a data sending rate at which the mobile terminal sends data to the AP;

a second maximum transmit power obtaining unit, configured to obtain a maximum transmit power when the mobile terminal sends data to the AP according to the RSSI and the data sending rate;

a data sending unit, configured to control the mobile terminal to send data to the AP at the maximum transmit power;

a fourth packet error rate obtaining unit, configured to obtain a fourth packet error rate generated when the terminal sends a power probe frame to the AP at the current transmit power;

a fourth packet error rate determining unit, configured to determine whether the fourth packet error rate is less than a preset attenuation trigger threshold;

a third current transmit power calculation unit, configured to: when the fourth packet error rate is less than the preset attenuation trigger threshold, subtract a preset power change step value from the current transmit power of the mobile terminal;

a second preset transmit power determining unit, configured to: when the fourth packet error rate is not less than the preset attenuation trigger threshold, determine the current transmit power of the mobile terminal as a preset transmit power corresponding to both the RSSI and the data sending rate, and use the preset transmit power as a third target transmit power; and a third target transmit power adjustment unit, configured to adjust the current transmit power of the mobile terminal to the third target transmit power.

With reference to the sixth aspect, in a first possible implementation of the sixth aspect, the apparatus further includes a fourth current transmit power calculation unit and a third target transmit power determining unit, where the fourth packet error rate determining unit is further configured to: when the fourth packet error rate is not less than the preset attenuation trigger threshold, determine whether the fourth packet error rate is less than a preset attenuation stop threshold;

the fourth current transmit power calculation unit is configured to: when the fourth packet error rate is not less than the preset attenuation stop threshold, add the preset power change step value to the current transmit power of the mobile terminal, and use an obtained result as the third target transmit power;

the third target transmit power determining unit is configured to: when the fourth packet error rate is less than the preset attenuation stop threshold, use the current transmit power of the mobile terminal as the third target transmit power; and the third target transmit power adjustment unit is further configured to adjust the current transmit power of the mobile terminal to the third target transmit power.

The technical solutions provided in the embodiments of the present invention can have the following beneficial effects:

According to the transmit power control method and apparatus provided in the present invention, after it is monitored that the mobile terminal has accessed the AP, the RSSI of the data signal that is sent by the AP and received by the mobile terminal and the sending rate at which the mobile terminal sends data to the AP are separately detected, and the pre-established transmit power relationship table is searched for the preset transmit power corresponding to both the RSSI and the sending rate, so that the mobile terminal adjusts the current transmit power to the preset transmit power and sends data to the AP at the preset transmit power. That is, the mobile terminal can dynamically adjust, according to a specific application environment, a transmit power at which the mobile terminal sends data to the AP. This avoids a related-art problem of excessively large unwanted power consumption because data is usually sent to an AP at a fixed transmit power, so as to reduce a battery power loss of the mobile terminal and further effectively prolong a battery life of the mobile device.

It should be understood that, the foregoing general description and the following detailed description are merely illustrative and explanatory, and are not intended to limit the present invention.

BRIEF DESCRIPTION OF DRAWINGS

The drawings herein are incorporated in this specification and constitute a part of this specification, show embodiments conforming to the present invention, and explain principles of the present invention together with this specification.

DESCRIPTION OF EMBODIMENTS

Example embodiments are described in detail herein, and examples of the example embodiments are presented in the accompanying drawings. When the following description relates to the accompanying drawings, unless specified otherwise, identical numbers in different accompanying drawings represent a same or similar element. Implementations described in the following example embodiments do not represent all implementations consistent with the present invention. On the contrary, they are only examples of apparatuses and methods that are consistent with some aspects of the present invention and that are described in the appended claims in detail.

Figure 1:
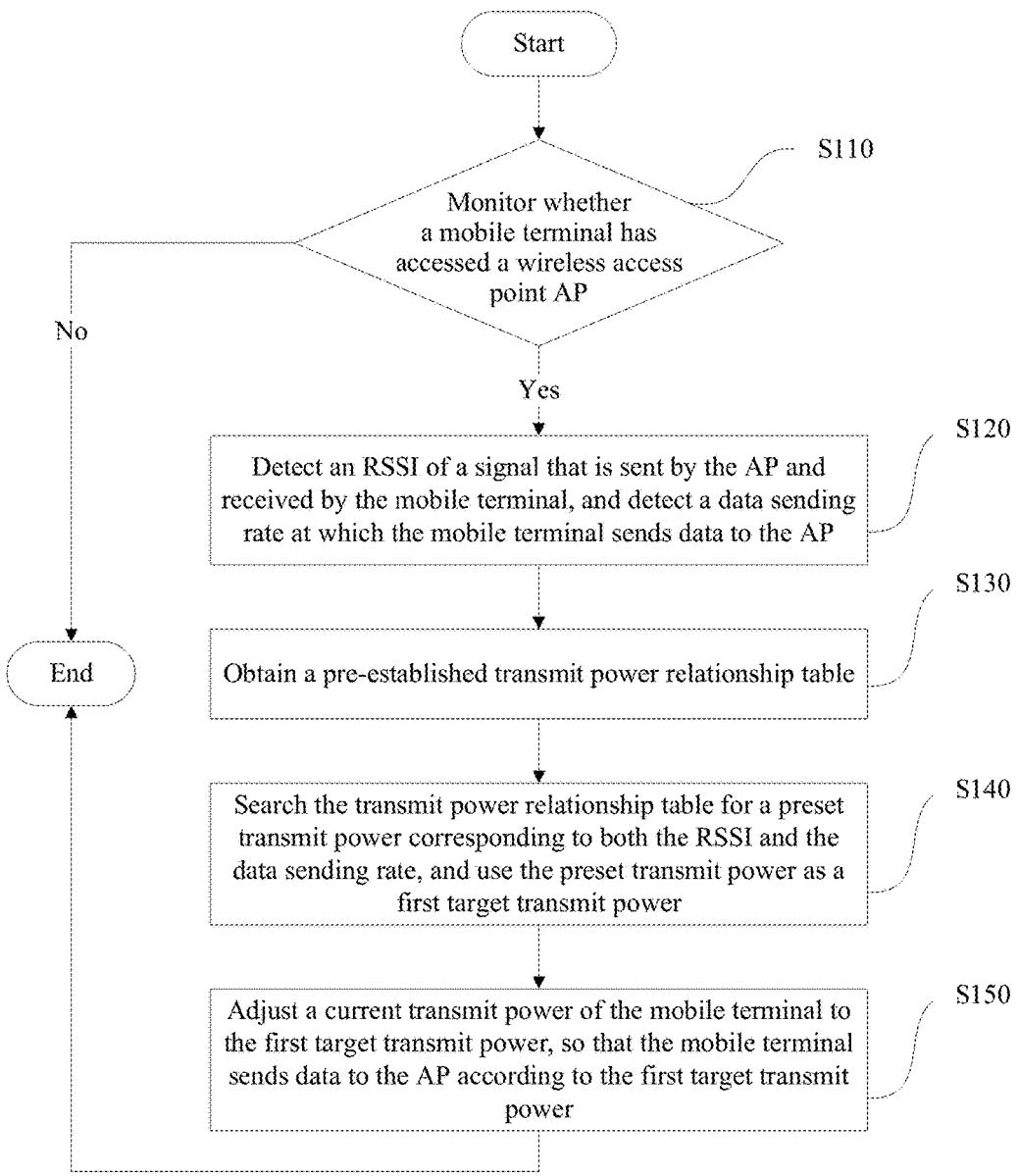
FIG. 1 is a flowchart of a transmit power control method according to an example embodiment.

In the related art, a mobile terminal sends data to an AP at a fixed transmit power after accessing the AP. As a result, unwanted power consumption of the mobile terminal is excessively large, and battery power is consumed excessively quickly, and therefore a battery life of the mobile terminal is severely affected. To resolve the problem, a transmit power control method is first provided in an embodiment of the present invention. As shown in FIG. 1, the method may include the following steps.

Step S110. Monitor whether a mobile terminal has accessed a wireless access point AP.

The mobile terminal may send a power probe frame to the AP when determining whether the mobile terminal has accessed the AP. The AP sends an ACK (Acknowledgement, acknowledgement) to the mobile terminal after successfully receiving the power probe frame, to acknowledge that the AP has successfully received the power probe frame sent by the mobile terminal. If the mobile terminal receives, after sending the power probe frame to the AP, the ACK sent by the AP, the mobile terminal has successfully accessed the AP; or if the mobile terminal does not receive the ACK sent by the AP, the mobile terminal has failed to access the AP.

It should be noted that the mobile terminal in this embodiment of the present invention may be a device having a Wi-Fi function, such as a mobile phone or a tablet computer.

Step S120. When the mobile terminal has accessed the AP, detect an RSSI of a signal that is sent by the AP and received by the mobile terminal, and detect a data sending rate at which the mobile terminal sends data to the AP.

After accessing the AP, the mobile terminal needs to detect the RSSI of the signal that is sent by the AP and received by the mobile terminal. The RSSI is an indicator that can reflect a strength level of a signal that is sent by the AP and currently received by the mobile terminal. A larger RSSI indicates better signal coverage of a network in which the mobile terminal is located.

After accessing the AP, the mobile terminal adjusts, according to a status of a data packet that needs to be sent to the AP, a data sending rate at which data is sent to the AP. That is, the data sending rate of the mobile terminal is a variable. Therefore, a data sending rate at which the mobile terminal currently sends data to the AP needs to be detected.

Step S130. Obtain a pre-established transmit power relationship table.

The transmit power relationship table is pre-established and may be saved in the mobile terminal. In the transmit power relationship table, in the case of a same RSSI, each data sending rate is corresponding to one preset transmit power.

It should be noted that, in the transmit power relationship table, in the case of a same RSSI, each data sending rate is corresponding to one preset transmit power, and the preset transmit power may be a minimum transmit power corresponding to both the RSSI and the data sending rate. When the mobile terminal sends data to the AP by using the minimum transmit power corresponding to both the RSSI and the data sending rate, power consumption of the mobile terminal can be reduced to a maximum extent. Certainly, the mobile terminal may alternatively send data to the AP by using a transmit power that is between a maximum transmit power and the preset transmit power and corresponding to both the RSSI and the data sending rate. Compared with sending data at a maximum transmit power in the related art, this can reduce power consumption of the mobile terminal to some extent, but power consumption of the mobile terminal can be reduced to a maximum extent when the data is sent to the AP at the minimum transmit power corresponding to both the RSSI and the data sending rate. Therefore, in the transmit power relationship table provided in this embodiment of the present invention, each data sending rate is preferably corresponding to one minimum transmit power in the case of a same RSSI.

When there is no strong spatial interference, in an example in which a mobile phone is connected to a 54-Mbps AP of 5-GHz Wi-Fi, referring to Table 1, a test result can be obtained when a transmit power of a mobile phone is reduced under different RSSIs: With an RSSI of above −55 dBm, when the transmit power of the mobile phone is reduced from a typical value 16 dBm to 10 dBm, quality of communication between the mobile phone and an AP is essentially not affected.

TABLE 1

Throughput under a 54-Mbps rate of 5-GHz Wi-Fi

| RSSI (dBm) | Mobile phone amplifier output power (dBm) | TCP-UP (Mbps) | TCP-DOWN (Mbps) |
|---|---|---|---|
| −27 | 16 | 30 | 28.2 |
|  | 14 | 30.2 | 28.3 |
|  | 12 | 30.1 | 28.4 |
|  | 10 | 30.26 | 28.4 |
|  | 8 | 30.2 | 28.48 |
| −32 | 16 | 30.29 | 28.5 |
|  | 14 | 30.28 | 28.52 |
|  | 12 | 30.4 | 28.53 |
|  | 10 | 30.37 | 28.4 |
|  | 8 | 30.2 | 28.3 |
| −46 | 16 | 30.3 | 28.4 |
|  | 14 | 30.3 | 28.5 |
|  | 12 | 30.44 | 28.44 |
|  | 10 | 30.2 | 28.4 |
|  | 8 | 30.4 | 28.5 |
| −57 | 16 | 30.5 | 28.5 |
|  | 14 | 30.13 | 28.48 |
|  | 12 | 30.1 | 28.4 |
|  | 10 | 30.16 | 28.42 |
|  | 8 | 30.3 | 28.5 |
| −66 | 16 | 30.3 | 27.6 |
|  | 14 | 30.5 | 27.4 |
|  | 12 | 30.4 | 27.5 |
|  | 10 | 30.1 | 27.3 |
|  | 8 | 30.4 | 27.2 |
| −76 | 16 | 29.8 | 25.7 |
|  | 14 | 23.6 | 26.04 |
|  | 12 | 0 | 21.5 |
|  | 10 | 0 | 11.79 |
|  | 8 | 0 | 0 |

Therefore, a transmit power of the mobile terminal can be reduced as much as possible when it can be ensured that quality of communication between the mobile terminal and the AP is essentially not affected, to determine a preset transmit power corresponding to both an RSSI and a data sending rate and form a transmit power relationship table having different RSSIs and different data sending rates.

Step S140. Search the transmit power relationship table for a preset transmit power corresponding to both the RSSI and the data sending rate, and use the preset transmit power as a first target transmit power.

Step S150. Adjust a current transmit power of the mobile terminal to the first target transmit power, so that the mobile terminal sends data to the AP according to the first target transmit power.

Figure 2:
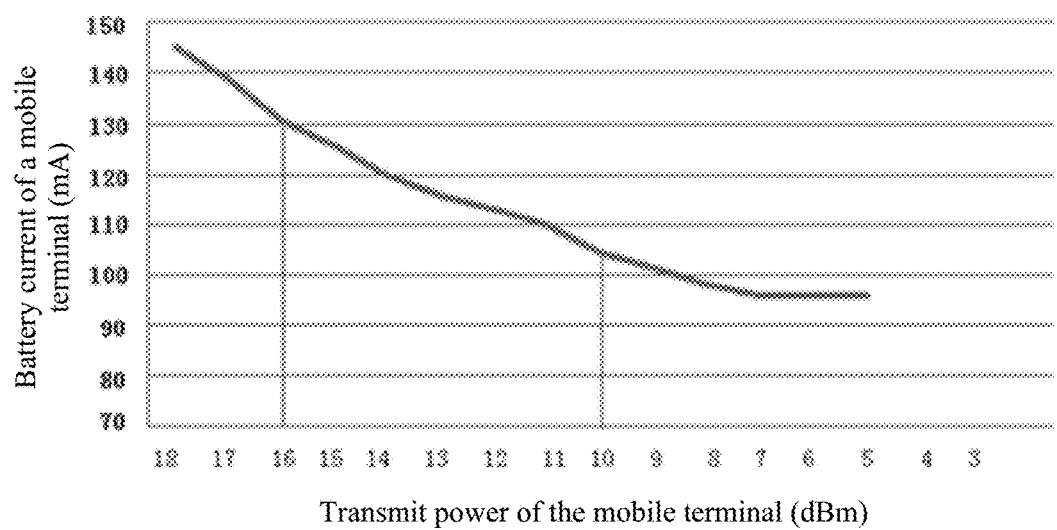
FIG. 2 is a diagram of a relationship between a battery current and a transmit power of a mobile terminal according to an embodiment of the present invention.

FIG. 2 is a diagram of a relationship between a battery current and a transmit power of the mobile terminal according to this embodiment of the present invention. As shown in FIG. 2, when the transmit power of the mobile terminal is reduced from 16 dBm to 10 dBm, it can be seen that the battery current of the mobile terminal is reduced from 130 mA to about 103 mA. This effectively reduces battery power consumption of the mobile terminal.

Therefore, the transmit power relationship table is searched for the preset transmit power corresponding to both the RSSI and the data sending rate, so that the mobile terminal sends data to the AP at the minimum transmit power. This can effectively reduce a power loss of the mobile terminal, and can effectively prolong a battery life of the mobile terminal when battery power of the mobile terminal is limited.

According to the transmit power control method provided in the present invention, after it is monitored that the mobile terminal has accessed the AP, the RSSI of the data signal that is sent by the AP and received by the mobile terminal and the sending rate at which the mobile terminal sends data to the AP are separately detected, and the pre-established transmit power relationship table is searched for the preset transmit power corresponding to both the RSSI and the sending rate, so that the mobile terminal adjusts the current transmit power to the preset transmit power and sends data to the AP at the preset transmit power. That is, the mobile terminal can dynamically adjust, according to a specific application environment, a transmit power at which the mobile terminal sends data to the AP. This avoids a related-art problem of excessively large unwanted power consumption because data is usually sent to an AP at a fixed transmit power, so as to reduce a battery power loss of the mobile terminal and further effectively prolong a battery life of the mobile device.

Figure 3:
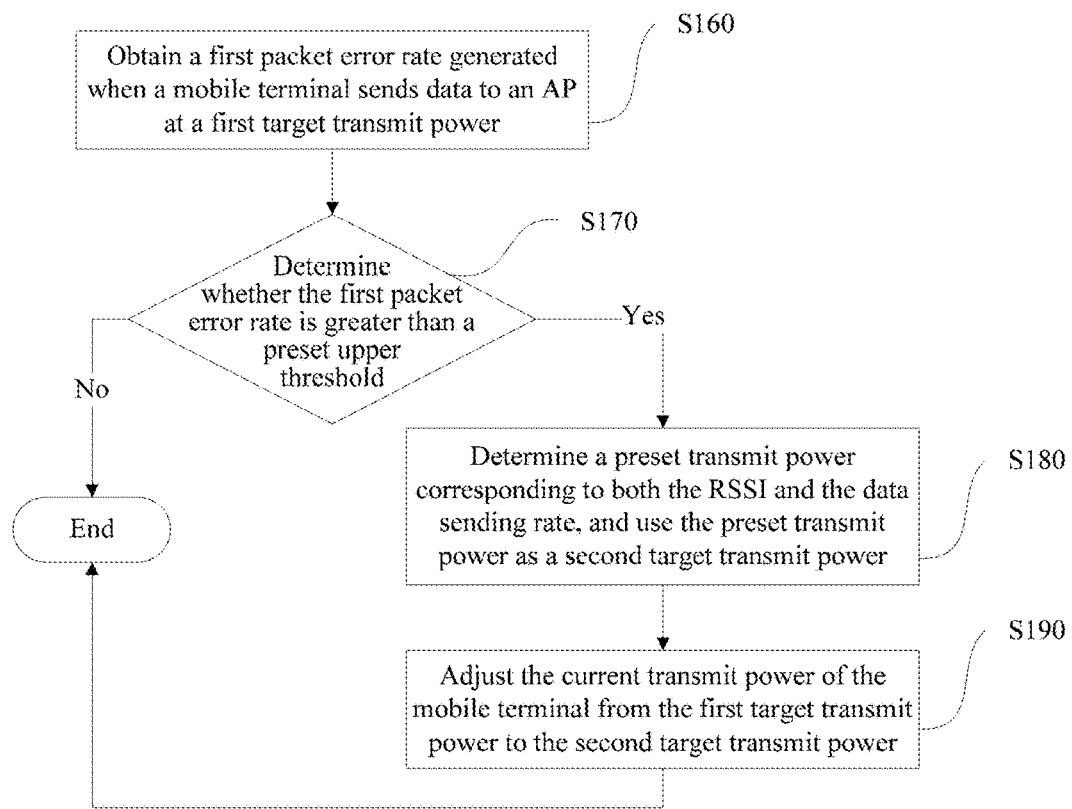
FIG. 3 is a flowchart of a transmit power control method according to another example embodiment.

Because the transmit power relationship table is pre-established, when a current environment in which the mobile terminal accesses the AP changes, it may occur that a preset transmit power that is corresponding to both a current RSSI and a current data sending rate and that is found in the transmit power relationship table cannot meet an actual requirement. For example, when noise interference currently received by the mobile terminal is relatively severe, using the preset transmit power found in the pre-established transmit power relationship table may result in a relatively large packet error rate. To obtain good quality of communication between the mobile terminal and the AP, a current packet error rate of the mobile terminal further needs to be ensured. Therefore, in another embodiment of the present invention, as shown in FIG. 3, the transmit power control method provided in the present invention may further include the following steps.

S160. Obtain a first packet error rate generated when the mobile terminal sends data to the AP at the first target transmit power.

When searching the transmit power relationship table for the preset transmit power corresponding to both the RSSI and the data sending rate, and sending data to the AP by using the minimum transmit power, to obtain good quality of communication between the mobile terminal and the AP, the mobile terminal needs to detect a packet error rate generated when the mobile terminal sends data to the AP. The packet error rate may be calculated by using the following formula (1):

$$\text{PER\_CURRENT} = \Delta t x \text{bad} / (\Delta t x \text{bad} + \Delta t x \text{good}) \quad (1)$$

where PER_CURRENT represents a packet error rate, $\Delta txgood$ represents a quantity of data packets sent by the mobile terminal to the AP, and $\Delta txbad$ represents a quantity of ACK replies that are not received after the mobile terminal sends the data packets to the AP.

Step S170. Determine whether the first packet error rate is greater than a preset upper threshold.

The current first packet error rate of the mobile terminal that is obtained through calculation in step S160 is compared with the preset upper threshold. If the first packet error rate is not greater than the preset upper threshold, the current transmit power of the mobile terminal can obtain good link transmission quality for the mobile terminal to send data to the AP, and normal data sending is not affected. If the first packet error rate is greater than the preset upper threshold, the transmit power at which the mobile terminal sends data to the AP is excessively low, and link transmission quality for sending data by the mobile terminal to the AP has been affected.

Step S180. If the first packet error rate is greater than the preset upper threshold, determine a preset transmit power corresponding to both the RSSI and the data sending rate, and use the preset transmit power as a second target transmit power.

Therefore, when the first packet error rate is greater than the preset upper threshold, the transmit power at which the mobile terminal sends data to the AP needs to be re-adjusted, to reduce the packet error rate generated when the mobile terminal sends data to the AP and obtain good link transmission quality for sending data by the mobile terminal to the AP.

Step S190. Adjust the current transmit power of the mobile terminal from the first target transmit power to the second target transmit power, so that the mobile terminal sends data to the AP according to the second target transmit power.

After the mobile terminal recalculates the preset transmit power corresponding to both the RSSI and the data sending rate, to enable the mobile terminal to directly obtain the corresponding transmit power by searching the transmit power relationship table according to the same RSSI and the same data sending rate, in a refined implementation of the method in FIG. 3, in still another embodiment of the present invention, the method in FIG. 3 may further include the following step:

Step S191. Update the transmit power relationship table.

The recalculated preset transmit power is recorded into the transmit power relationship table, to replace the original preset transmit power that is in the transmit power relationship table and corresponding to both the RSSI and the data sending rate. This can effectively avoid recalculation when the mobile terminal re-searches the transmit power relationship table.

Figure 4:
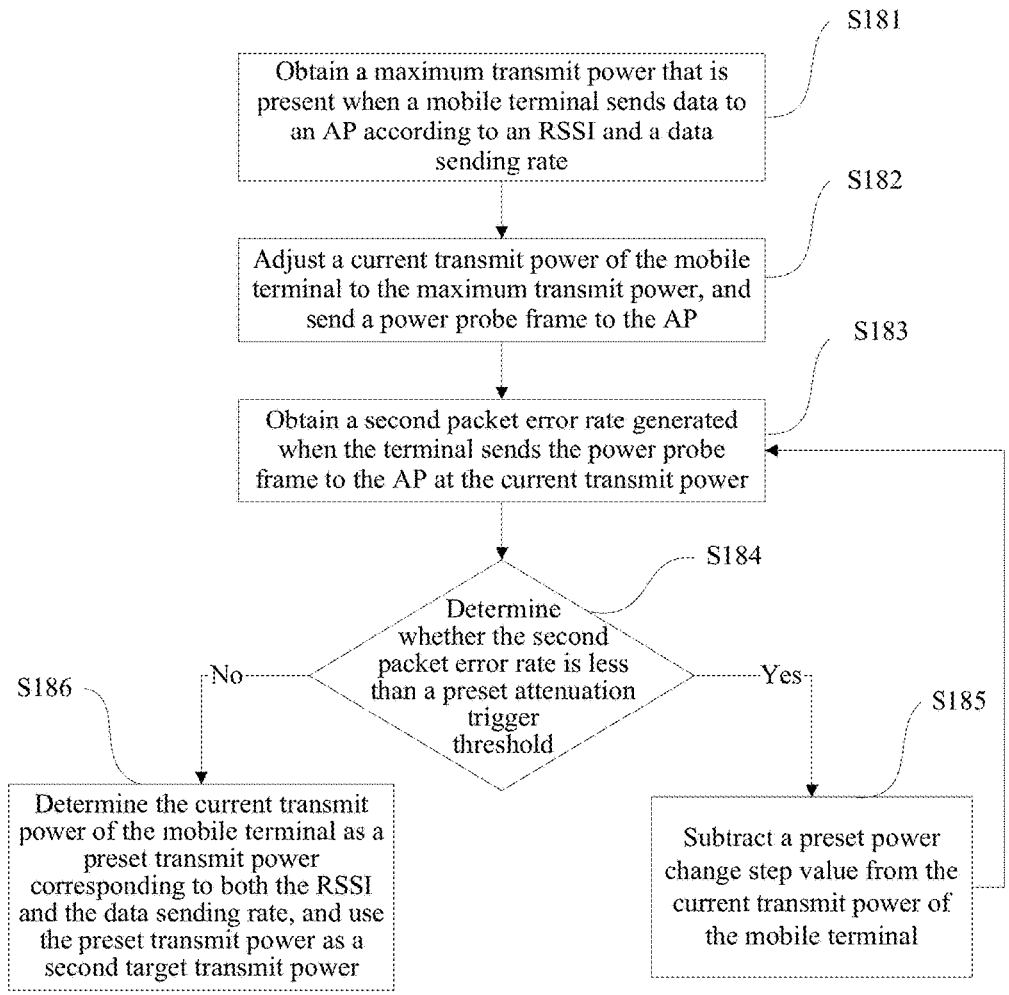
FIG. 4 is a flowchart of step S180 in FIG. 3.

To accurately determine the preset transmit power corresponding to both the RSSI and the data sending rate, in a refined implementation of the method in FIG. 3, in still another embodiment of the present invention, as shown in FIG. 4, step S180 may further include the following steps.

Step S181. Obtain a maximum transmit power when the mobile terminal sends data to the AP according to the RSSI and the data sending rate.

In an example in which the mobile terminal is connected to 5-GHz Wi-Fi, according to the IEEE 802.11ac standard, physical layer rates of the IEEE 802.11ac standard are listed in Table 2. It can be seen from Table 2 that a higher modulation order indicates a stricter requirement for an EVM (Error Vector Magnitude, error vector magnitude) indicator, and a lower transmit power in a case of fixed Wi-Fi power amplifier efficiency.

As listed in Table 2, Table 2 shows a variable control process when the mobile terminal sends a probe frame to the AP.

TABLE 2

| i | Modulation and coding scheme | Modulation type | Coding rate | EVM (dB) | Power |
|---|---|---|---|---|---|
| 0 | 0 | BPSK | 1/2 | −5 | P0 |
| 1 | 1 | QPSK | 1/2 | −10 | P1 |
| 2 | 2 | QPSK | 3/4 | −13 | P2 |
| 3 | 3 | 16-QAM | 1/2 | −16 | P3 |
| 4 | 4 | 16-QAM | 3/4 | −19 | P4 |
| 5 | 5 | 64-QAM | 2/3 | −22 | P5 |

TABLE 2-continued

| i | Modulation and coding scheme | Modulation type | Coding rate | EVM (dB) | Power |
|---|---|---|---|---|---|
| 6 | 6 | 64-QAM | 3/4 | −25 | P6 |
| 7 | 7 | 64-QAM | 5/6 | −28 | P7 |
| 8 | 8 | 256-QAM | 3/4 | −30 | P8 |
| 9 | 9 | 256-QAM | 5/6 | −32 | P9 |

Step S182. Adjust the current transmit power of the mobile terminal to the maximum transmit power, and send a power probe frame to the AP.

The power probe frame sent by the mobile terminal to the AP in this embodiment of the present invention may be specifically a management frame or a control frame that complies with the IEEE 802.11ac standard, and is not limited to a data frame.

Step S183. Obtain a second packet error rate generated when the terminal sends the power probe frame to the AP at the current transmit power.

After the mobile terminal sends the power probe frame to the AP, if the AP receives the power probe frame sent by the mobile terminal, the AP sends an ACK to the mobile terminal, to acknowledge that the AP has successfully received the power probe frame sent by the mobile terminal. After the mobile terminal sends a power probe frame to the AP, if the mobile terminal does not receive an ACK sent by the AP, the AP has failed to correctly receive the power probe frame sent by the mobile terminal. This causes a data loss and results in a packet error rate.

Therefore, the second packet error rate generated when the terminal sends the power probe frame to the AP at the current transmit power may be calculated according to the foregoing formula (1). Details are not repeated herein.

Step S184. Determine whether the second packet error rate is less than a preset attenuation trigger threshold.

When the second packet error rate is less than the preset attenuation trigger threshold, step S185 is performed; or when the second packet error rate is not less than the preset attenuation trigger threshold, step S186 is performed.

The preset attenuation trigger threshold may be set according to a specific requirement, for example, may be 5%.

Step S185. Subtract a preset power change step value from the current transmit power of the mobile terminal, and return to step S183.

If the second packet error rate is less than the preset attenuation trigger threshold, the current transmit power of the mobile terminal may be further reduced. In this case, the preset power change step value may be subtracted from the current transmit power of the mobile terminal, and then, return to step S183 to perform determining again.

The preset power change step value may be specifically set according to a situation. For example, the preset power change step value may be 2 dB.

Step S186. Determine the current transmit power of the mobile terminal as the preset transmit power corresponding to both the RSSI and the data sending rate, and use the preset transmit power as the second target transmit power.

When the second packet error rate is not less than the preset attenuation trigger threshold, the second packet error rate generated when the mobile terminal sends the power probe frame to the AP is already greater than or equal to the preset attenuation trigger threshold. To avoid further reducing the current transmit power of the mobile terminal, so as to avoid further increasing the second packet error rate generated when the mobile terminal sends the power probe frame to the AP at the current transmit power, there is no need to subtract the preset power change step value from the current power of the mobile terminal.

In this embodiment of the present invention, because the preset power change step value subtracted from the current transmit power of the mobile terminal each time is not very large, for example, 2 dB, a packet error rate of the mobile terminal is not greatly affected. When it is detected that the second packet error rate is not less than the preset attenuation trigger threshold, the current transmit power of the mobile terminal may be determined as the preset transmit power corresponding to both the RSSI and the data sending rate.

In addition, the preset transmit power corresponding to both the RSSI and the data sending rate may be obtained through calculation according to the foregoing embodiment, or may be obtained by searching the transmit power relationship table.

In an embodiment, that the minimum transmit power is determined as the preset transmit power corresponding to both the RSSI and the data sending rate is still used as an example for description. A manner of searching the transmit power relationship table mainly means that: After the transmit power relationship table is searched for the minimum transmit power corresponding to both the current RSSI and data sending rate, when the mobile terminal sends the data to the AP according to the minimum transmit power, if detecting that a packet error rate generated when the mobile terminal currently sends data to the AP is greater than the preset upper threshold, the mobile terminal searches the transmit power relationship table for a transmit power greater than the minimum transmit power corresponding to both the current RSSI and the current data sending rate, searches for a transmit power adjacent to the minimum transmit power, uses the found transmit power as the transmit power of the mobile terminal, and determines whether the packet error rate generated when the mobile terminal sends data to the AP meets a condition, and if the packet error rate does not meet the condition, continues to search the transmit power relationship table for a higher transmit power to be used as the current transmit power of the mobile terminal, until the packet error rate generated when the mobile terminal sends data to the AP meets the condition.

In still another example embodiment, after searching the transmit power relationship table for the minimum transmit power corresponding to both the current RSSI and the current data sending rate, when sending the data to the AP according to the minimum transmit power, if detecting that the packet error rate generated when the mobile terminal currently sends data to the AP is greater than the preset upper threshold, the mobile terminal may determine whether the current packet error rate meets the condition once each time a specified power, for example, 2 dB, is added to the current transmit power at which the mobile terminal currently sends the data to the AP, and each time the specified power is added to the transmit power of the mobile terminal, until a transmit power that meets the condition is obtained and used as a target transmit power for sending data to the AP.

Figure 5:
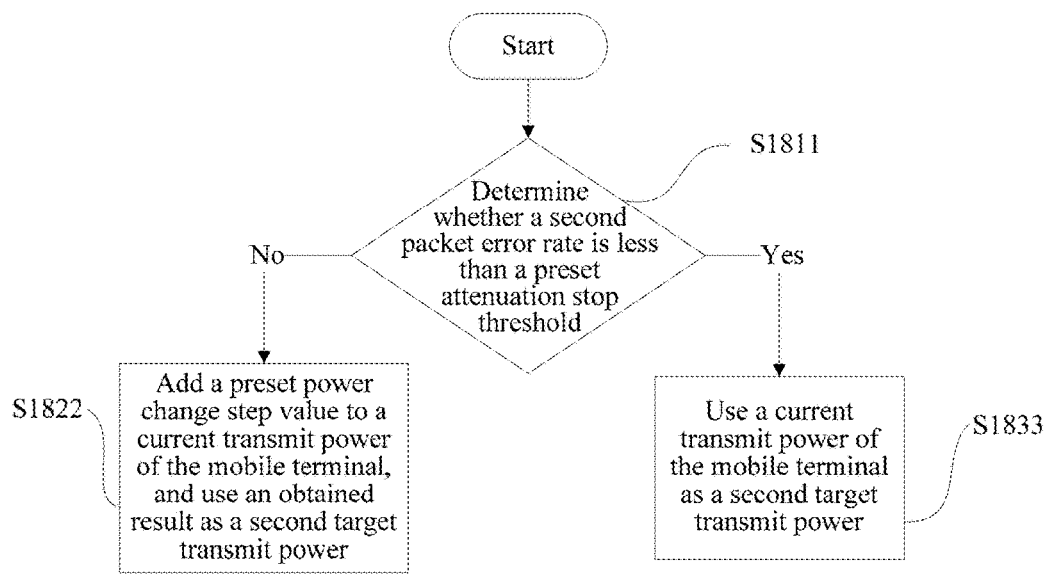
FIG. 5 is a flowchart of a transmit power control method according to still another example embodiment.

To further more accurately calculate the preset transmit power that is of the mobile terminal and that is corresponding to both the RSSI and the data sending rate, in a refined implementation of the method in FIG. 4, in still another embodiment of the present invention, as shown in FIG. 5, the method may further include the following steps.

Step S1811. When the second packet error rate is not less than the preset attenuation trigger threshold, determine whether the second packet error rate is less than a preset attenuation stop threshold.

In step S186, when the current second packet error rate of the mobile terminal is not less than the preset attenuation trigger threshold, the current transmit rate of the terminal device is determined as the preset transmit power corresponding to both the RSSI and the data sending rate. Herein, the second packet error rate generated with the determined preset transmit power corresponding to both the RSSI and the data sending rate may be a packet error rate greater than the preset attenuation trigger threshold. Certainly, this is specifically related to the preset power change step value.

Therefore, it is necessary to further compare the current second packet error rate of the mobile terminal with the preset attenuation stop threshold, to perform further determining. The preset attenuation stop threshold should be an allowable minimum packet error rate. If the preset attenuation stop threshold is less than the packet error rate, a requirement of the mobile terminal for normal data transmission and reception may not be met. For example, the preset attenuation stop threshold may be 10%, or may be set according to a specific requirement.

When the second packet error rate is not less than the preset attenuation stop threshold, step S1822 is performed; or when the second packet error rate is less than the preset attenuation stop threshold, step S1823 is performed.

Step S1822. Add the preset power change step value to the current transmit power of the mobile terminal, and use an obtained result as the second target transmit power.

The mobile terminal sends power probe frames to the AP starting with the maximum transmit power corresponding to both the RSSI and the data sending rate, and the preset power change step value is subtracted from the current transmit power of the mobile terminal each time. Therefore, when the second packet error rate is not less than the preset attenuation stop threshold, one more preset power change step value has been subtracted, and that the second packet error rate is less than the preset attenuation stop threshold may be met by adding the preset power change step value to the current transmit power of the mobile terminal.

Step S1823. Use the current transmit power of the mobile terminal as the second target transmit power.

In this case, the condition that the second packet error rate is less than the preset attenuation stop threshold is met, and the current transmit power of the mobile terminal may be used as the second target transmit power.

Figure 6:
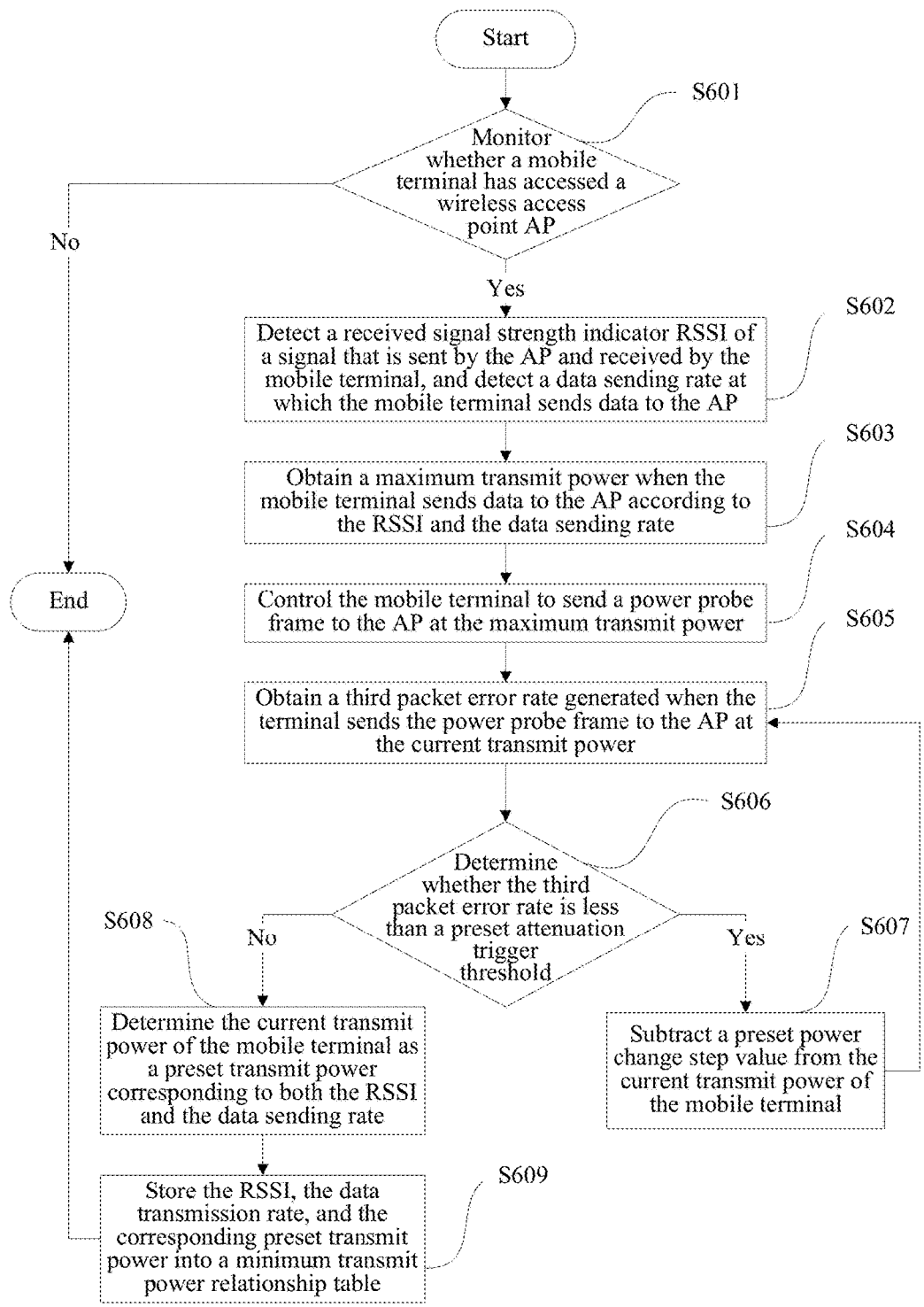
FIG. 6 is a flowchart of a transmit power control method according to still another example embodiment.

Further, to enable a mobile terminal to quickly obtain, according to a current RSSI and a current sending rate, a preset transmit power corresponding to both the RSSI and the data transmission rate by searching a transmit power relationship table, an embodiment of the present invention further provides a transmit power control method, so as to calculate corresponding preset transmit powers of the mobile terminal that are corresponding to different RSSIs and different sending rates, and save these different RSSIs and different sending rates and the corresponding preset transmit powers into the transmit power relationship table, to establish the transmit power relationship table of the mobile terminal. Therefore, in still another embodiment of the present invention, a transmit power control method provided in this embodiment of the present invention, as shown in FIG. 6, may include the following steps.

Step S601. Monitor whether a mobile terminal has accessed a wireless access point AP.

Step S602. When the mobile terminal has accessed the AP, detect a received signal strength indicator RSSI of a signal that is sent by the AP and received by the mobile terminal, and detect a data sending rate at which the mobile terminal sends data to the AP.

Step S603. Obtain a maximum transmit power when the mobile terminal sends data to the AP according to the RSSI and the data sending rate.

Step S604. Control the mobile terminal to send a power probe frame to the AP at the maximum transmit power.

Step S605. Obtain a third packet error rate generated when the terminal sends the power probe frame to the AP at the current transmit power.

Step S606. Determine whether the third packet error rate is less than a preset attenuation trigger threshold.

Step S607. When the third packet error rate is less than the preset attenuation trigger threshold, subtract a preset power change step value from the current transmit power of the mobile terminal, and return to step S605.

Step S608. When the third packet error rate is not less than the preset attenuation trigger threshold, determine the current transmit power of the mobile terminal as a preset transmit power corresponding to both the RSSI and the data sending rate.

Step S609. Save the RSSI, the data transmission rate, and the corresponding preset transmit power into a transmit power relationship table.

Figure 7:
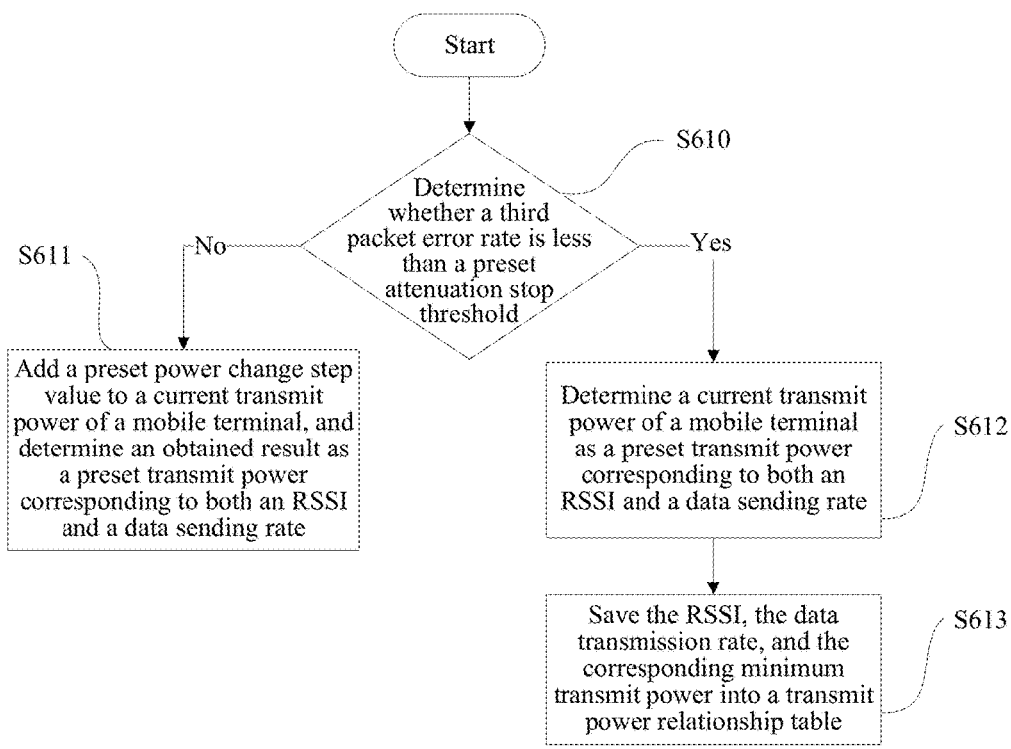
FIG. 7 is a flowchart of a transmit power control method according to still another example embodiment.

To further more accurately calculate the preset transmit power corresponding to both the RSSI and the data sending rate, in a refined implementation of the method in FIG. 6, in still another embodiment of the present invention, as shown in FIG. 7, the method may further include the following steps.

Step S610. When the third packet error rate is not less than the preset attenuation trigger threshold, determine whether the third packet error rate is less than a preset attenuation stop threshold.

Step S611. When the third packet error rate is not less than the preset attenuation stop threshold, add the preset power change step value to the current transmit power of the mobile terminal, and determine an obtained result as the preset transmit power corresponding to both the RSSI and the data sending rate.

Step S612. When the third packet error rate is less than the preset attenuation stop threshold, determine the current transmit power of the mobile terminal as the preset transmit power corresponding to both the RSSI and the data sending rate.

Step S613. Save the RSSI, the data transmission rate, and the corresponding preset transmit power into the transmit power relationship table.

The transmit power relationship table is established according to the method provided in the foregoing embodiment of the present invention. In the transmit power relationship table, grouping is performed according to RSSIs of signals received by the mobile terminal, so as to obtain preset transmit powers of the mobile terminal that are corresponding to different RSSIs and different sending rates. For example, as listed in Table 3, a transmit power relationship table of the mobile terminal is established.

TABLE 3

Wi-Fi device's mapping table of preset transmit powers with different RSSIs and different sending rates

| RSSI/Rate | 11b/ 1M | ... | 11g/ 6M | ... | 11g/ 54M | 11n/ MCS0 | ... | 11n/ MCS7 | 11ac/ MCS8 | 11ac/ MCS9 |
|---|---|---|---|---|---|---|---|---|---|---|
| RSSI Min | 16 | ... | 16 | ... | 15 | 15 | ... | 14 | 13 | 13 |
| RSSI Min + Delta_RSI | 15 | ... | 15 | ... | 14 | 14 | ... | 13 | 12 | 12 |
| RSSI Min + 2 * Delta_RSI | 14 | ... | 14 | ... | 13 | 13 | ... | 12 | 11 | 11 |
| ... | ... | ... | ... | ... | ... | ... | ... | ... | ... | ... |
| RSSI Min + n * Delta_RSI | 12 | ... | 12 | ... | 11 | 11 | ... | 10 | 9 | 9 |
| RSSI Max | 10 | ... | 10 | ... | 9 | 9 | ... | 8 | 7 | 7 |

The first row of Table 3 lists different sending rates of the mobile terminal, and other rows list different RSSIs of signals received by the mobile terminal, where Min is an initial RSSI value, and Delta represents a variable. These other rows of Table 3, from top to bottom, represent a series, starting from Min, of different RSSI values obtained each time after the variable Delta is added to an RSSI.

Figure 8:
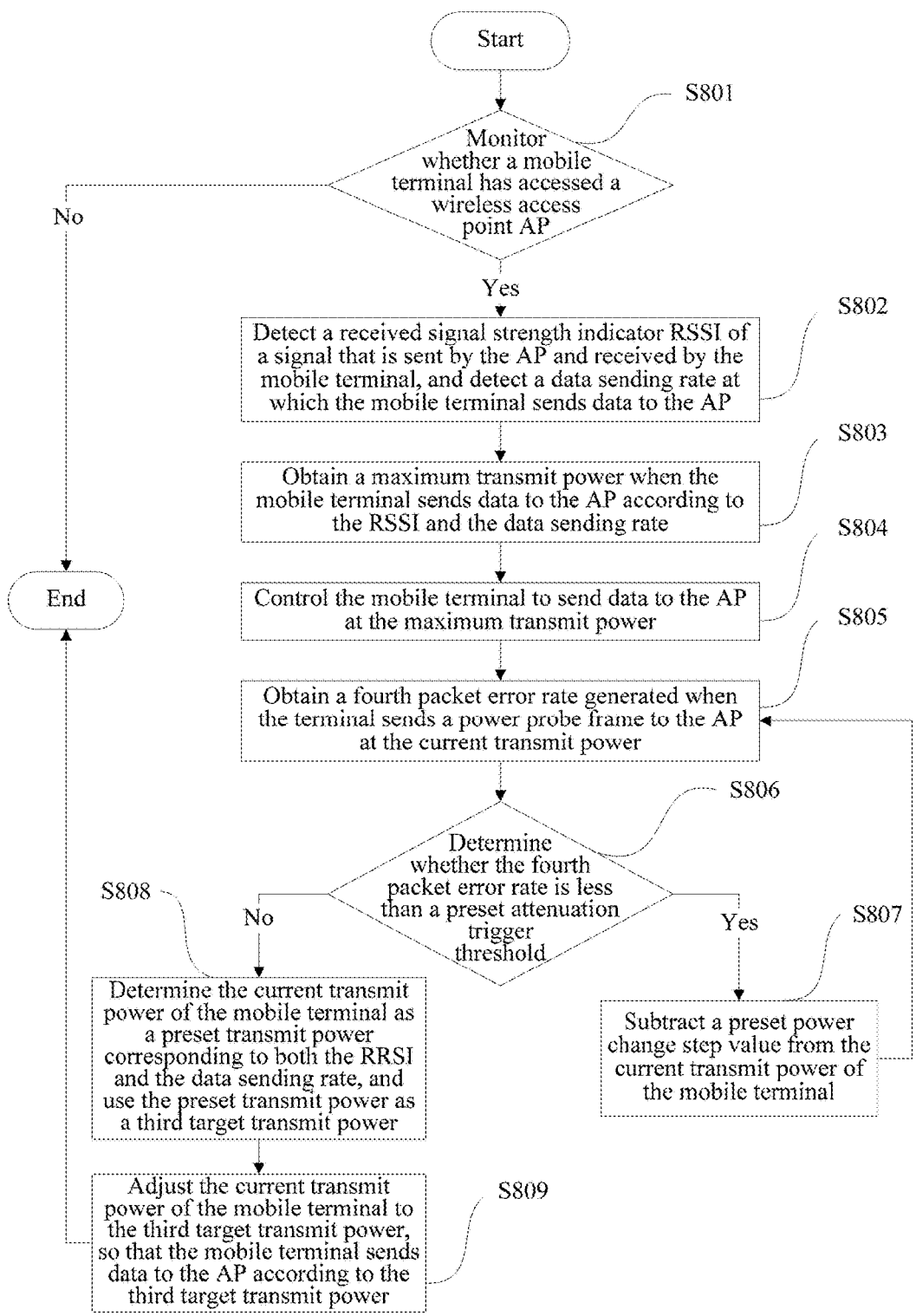
FIG. 8 is a flowchart of a transmit power control method according to still another example embodiment.

Further, to enable the mobile terminal to directly calculate, according to a current RSSI and a current sending rate, a preset transmit power corresponding to both the RSSI and the sending rate, in still another embodiment of the present invention, a transmit power control method provided in this embodiment of the present invention, as shown in FIG. 8, may include the following steps.

Step S801. Monitor whether a mobile terminal has accessed a wireless access point AP.

Step S802. When the mobile terminal has accessed the AP, detect a received signal strength indicator RSSI of a signal that is sent by the AP and received by the mobile terminal, and detect a data sending rate at which the mobile terminal sends data to the AP.

Step S803. Obtain a maximum transmit power when the mobile terminal sends data to the AP according to the RSSI and the data sending rate.

Step S804. Control the mobile terminal to send data to the AP at the maximum transmit power.

Step S805. Obtain a fourth packet error rate generated when the terminal sends a power probe frame to the AP at the current transmit power.

Step S806. Determine whether the fourth packet error rate is less than a preset attenuation trigger threshold.

Step S807. When the fourth packet error rate is less than the preset attenuation trigger threshold, subtract a preset power change step value from the current transmit power of the mobile terminal, and return to step S805.

Step S808. When the fourth packet error rate is not less than the preset attenuation trigger threshold, determine the current transmit power of the mobile terminal as a preset transmit power corresponding to both the RSSI and the data sending rate, and use the preset transmit power as a third target transmit power.

Step S809. Adjust the current transmit power of the mobile terminal to the third target transmit power, so that the mobile terminal sends data to the AP according to the third target transmit power.

Figure 9:
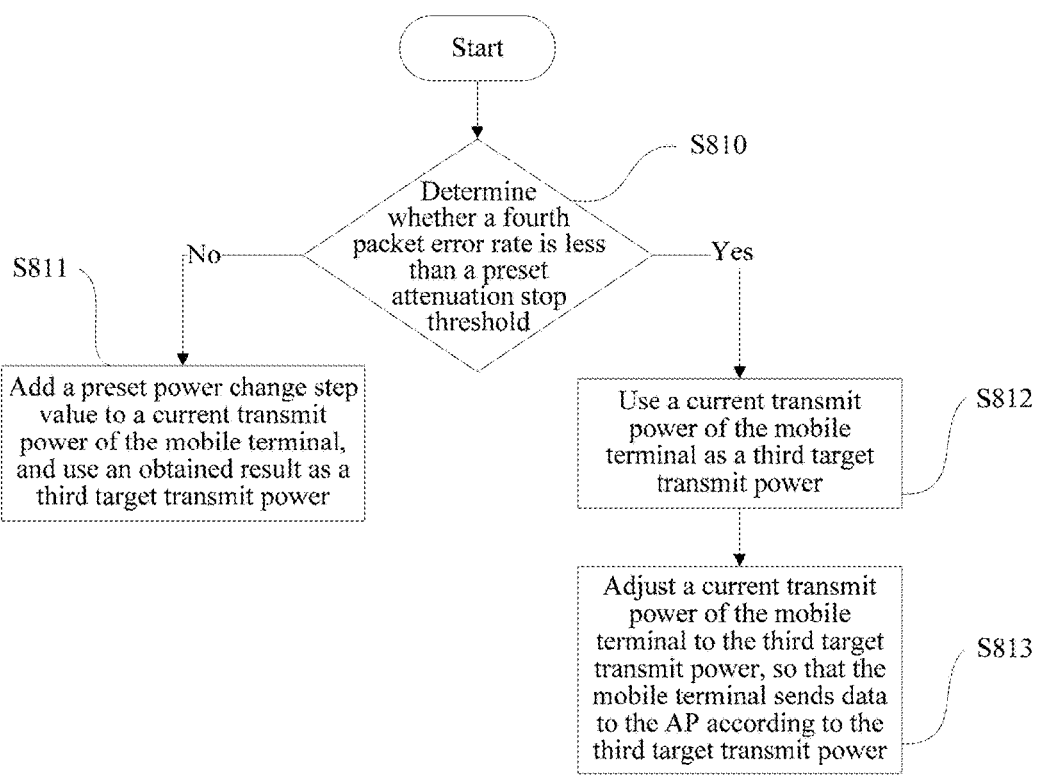
FIG. 9 is a flowchart of a transmit power control method according to still another example embodiment.

To further more accurately calculate the preset transmit power corresponding to both the RSSI and the data sending rate, in a refined implementation of the method in FIG. 8, in still another embodiment of the present invention, as shown in FIG. 9, the method may further include the following steps:

Step S810. When the fourth packet error rate is not less than the preset attenuation trigger threshold, determine whether the fourth packet error rate is less than a preset attenuation stop threshold.

Step S811. When the fourth packet error rate is not less than the preset attenuation stop threshold, add the preset power change step value to the current transmit power of the mobile terminal, and use an obtained result as the third target transmit power.

Step S812. When the fourth packet error rate is less than the preset attenuation stop threshold, use the current transmit power of the mobile terminal as the third target transmit power.

Step S813. Adjust the current transmit power of the mobile terminal to the third target transmit power, so that the mobile terminal sends data to the AP according to the third target transmit power.

It should be noted that, the foregoing embodiments provided in the present invention may be combined with each other, the same or similar solutions in the embodiments are not repeatedly described, and mutual reference may be made between the related specific technical methods and steps.

Figure 10:
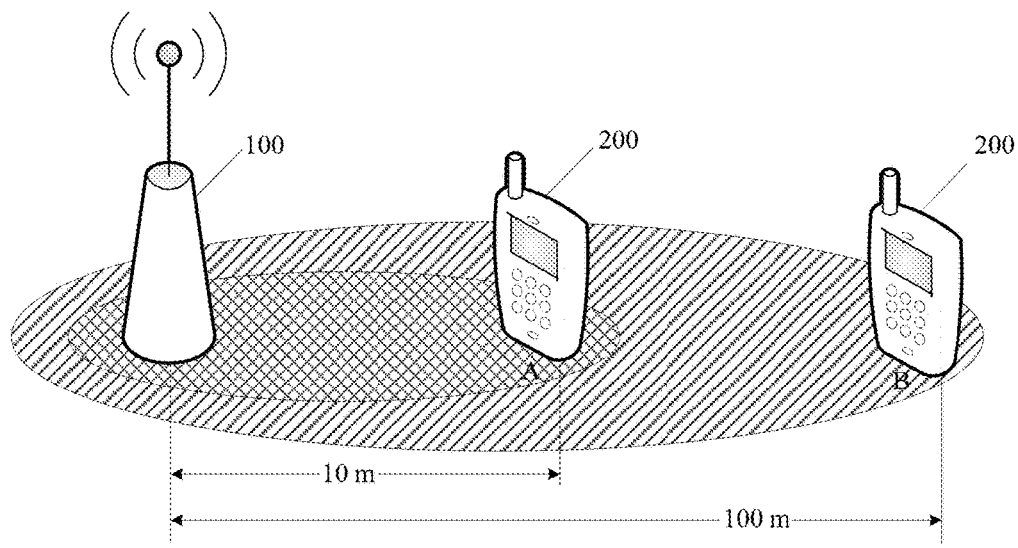
FIG. 10 is a schematic diagram of an application scenario of a transmit power control method according to an example embodiment.

FIG. 10 shows a schematic diagram of an application scenario of a transmit power control method according to an embodiment. As shown in FIG. 10, when a mobile phone is in a point B, assuming that a distance between the mobile phone and an AP is 100 m in this case, if interference caused by a factor, such as a building, to data transmission between the AP and a mobile terminal is considered, an RSSI of a signal that is sent by the AP and received by the mobile terminal in the point B is relatively small, and a relatively high transmit power is needed to send data to the AP when the mobile terminal uses a given data sending rate. In FIG. 10, 100 represents a device that provides the AP, and 200 represents the mobile phone.

If the mobile phone moves from the point B to a point A, for example, the mobile phone moves from a position 100 m away from the AP to a position 10 m away from the AP, in this case, an RSSI that is sent by the AP and received by the mobile phone may be greater than that when the mobile terminal is located at the point B. When the mobile terminal uses a given data sending rate, if the mobile phone uses the transmit power control method provided in the foregoing embodiments, compared with using the related art by the mobile phone to send data to the AP at a maximum transmit power, a power loss of the mobile phone can be reduced to a great extent. In this way, a battery power loss of the mobile terminal is reduced, and therefore a battery life of the mobile device is prolonged.

According to the transmit power control method provided in the present invention, after it is monitored that the mobile terminal has accessed the AP, the RSSI of the data signal that is sent by the AP and received by the mobile terminal and the sending rate at which the mobile terminal sends data to the AP are separately detected, and the pre-established transmit power relationship table is searched for the preset transmit power corresponding to both the RSSI and the sending rate, so that the mobile terminal adjusts the current transmit power to the preset transmit power and sends data to the AP at the preset transmit power. That is, the mobile terminal can dynamically adjust, according to a specific application environment, a transmit power at which the mobile terminal sends data to the AP. This avoids a related-art problem of excessively large unwanted power consumption because data is usually sent to an AP at a fixed transmit power, so as to reduce a battery power loss of the mobile terminal and further effectively prolong a battery life of the mobile device.

In addition, in this embodiment of the present invention, a calculation process for establishing the transmit power relationship table is further provided, the mobile terminal may calculate an appropriate preset transmit power such as a current minimum transmit power according to an RSSI of a data signal sent by an AP in a current environment and a sending rate at which the mobile terminal sends data to the AP, and may also dynamically adjust, according to a specific application environment, a transmit power at which the mobile terminal sends data to the AP. This avoids the related-art problem of excessively large unwanted power consumption because data is usually sent to an AP at a fixed transmit power, so as to reduce the battery power loss of the mobile terminal, and further effectively prolong the battery life of the mobile device.

According to the foregoing description of the method embodiments, a person skilled in the art may clearly understand that the present invention may be implemented by using software in combination with a necessary common hardware platform, and certainly may alternatively be implemented by using hardware, while the former is a preferred implementation in most cases. Based on such an understanding, the technical solutions of the present invention essentially, or the part contributing to the prior art may be implemented in a form of a software product. The computer software product is saved in a storage medium, and includes several instructions for instructing a computer device (which may be a personal computer, a server, a network device, or the like) to perform all or a part of the steps of the methods described in the embodiments of the present invention. The foregoing storage medium includes a medium that can save program code, such as a read-only memory (ROM), a random access memory (RAM), a magnetic disk, or an optical disc.

Figure 11:
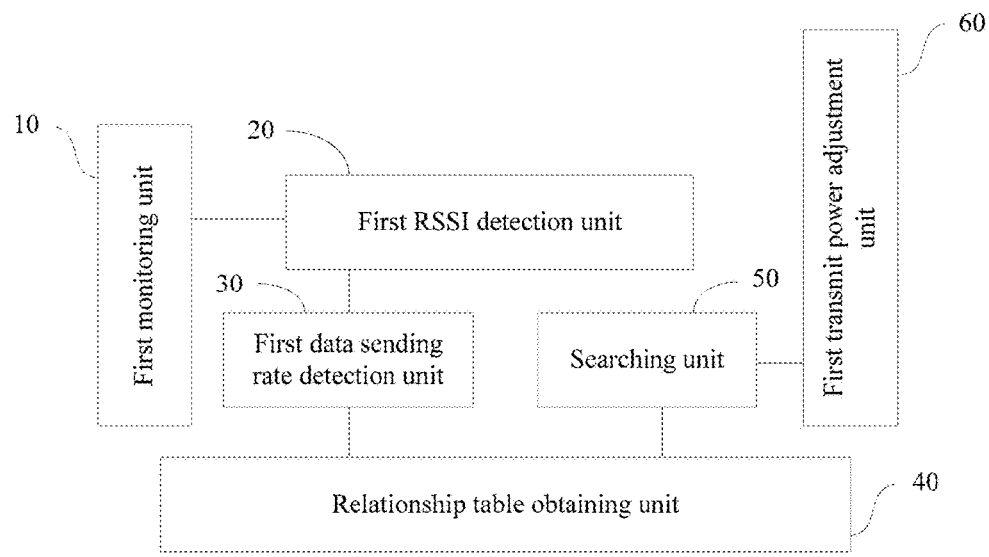
FIG. 11 is a schematic diagram of a transmit power control apparatus according to an example embodiment.

In addition, during implementation of the foregoing embodiments, an embodiment of the present invention further provides a transmit power control apparatus. The apparatus is located inside a mobile terminal. As shown in FIG. 11, the apparatus includes a first monitoring unit 10, a first RSSI detection unit 20, a first data sending rate detection unit 30, a relationship table obtaining unit 40, a searching unit 50, and a first transmit power adjustment unit 60.

The first monitoring unit 10 is configured to monitor whether the mobile terminal has accessed a wireless access point AP.

The first RSSI detection unit 20 is configured to: when the mobile terminal has accessed the AP, detect a received signal strength indicator RSSI of a signal that is sent by the AP and received by the mobile terminal.

The first data sending rate detection unit 30 is configured to detect a data sending rate at which the mobile terminal sends data to the AP.

The relationship table obtaining unit 40 is configured to obtain a pre-established transmit power relationship table, where in the transmit power relationship table, in the case of a same RSSI, each data sending rate is corresponding to one preset transmit power.

The searching unit 50 is configured to: search the transmit power relationship table for a preset transmit power corresponding to both the RSSI and the data sending rate, and use the preset transmit power as a first target transmit power.

The first transmit power adjustment unit 60 is configured to adjust a current transmit power of the mobile terminal to the first target transmit power.

Figure 12:
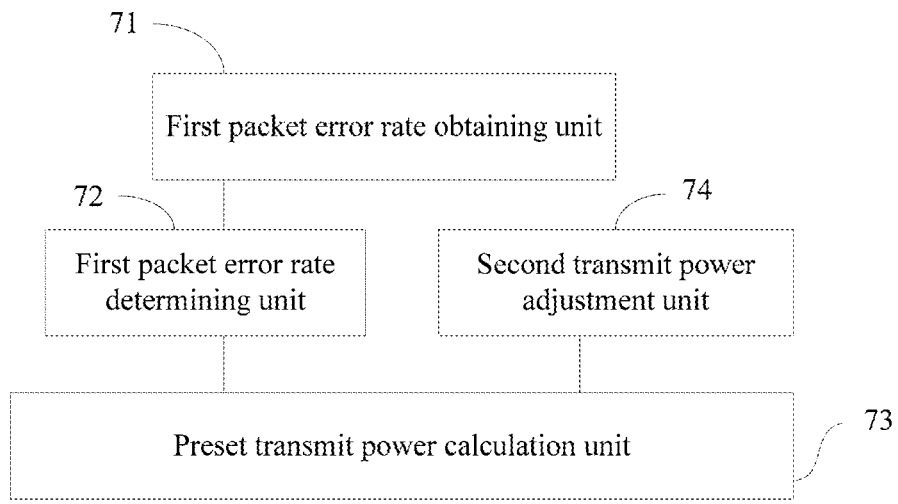
FIG. 12 is a schematic diagram of a transmit power control apparatus according to another example embodiment.

In another embodiment of the present invention, based on FIG. 11, as shown in FIG. 12, the transmit power control apparatus provided in this embodiment of the present invention may further include a first packet error rate obtaining unit 71, a first packet error rate determining unit 72, a preset transmit power calculation unit 73, and a second transmit power adjustment unit 74.

The first packet error rate obtaining unit 71 is configured to obtain a first packet error rate generated when the mobile terminal sends data to the AP at the first target transmit power.

The first packet error rate determining unit 72 is configured to determine whether the first packet error rate is greater than a preset upper threshold.

The preset transmit power calculation unit 73 is configured to: when the first packet error rate is greater than the preset upper threshold, determine a preset transmit power corresponding to both the RSSI and the data sending rate, and use the preset transmit power as a second target transmit power.

The second transmit power adjustment unit 74 is configured to adjust the current transmit power of the mobile terminal from the first target transmit power to the second target transmit power, so that the mobile terminal sends data to the AP according to the second target transmit power.

Figure 13:
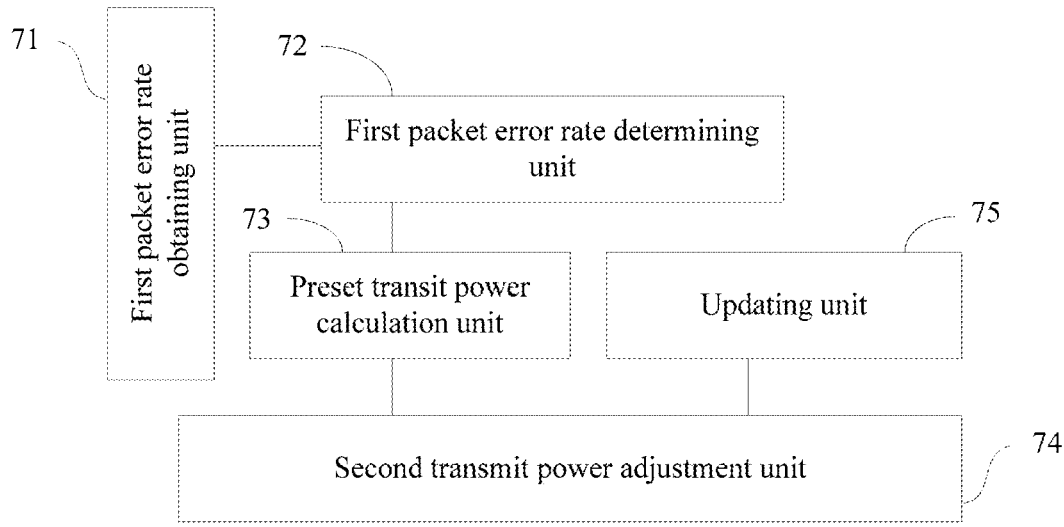
FIG. 13 is a schematic diagram of a transmit power control apparatus according to still another example embodiment.

In still another embodiment of the present invention, based on FIG. 12, as shown in FIG. 13, the transmit power control apparatus provided in this embodiment of the present invention may further include an updating unit 75.

The updating unit 75 is configured to update the transmit power relationship table.

Figure 14:
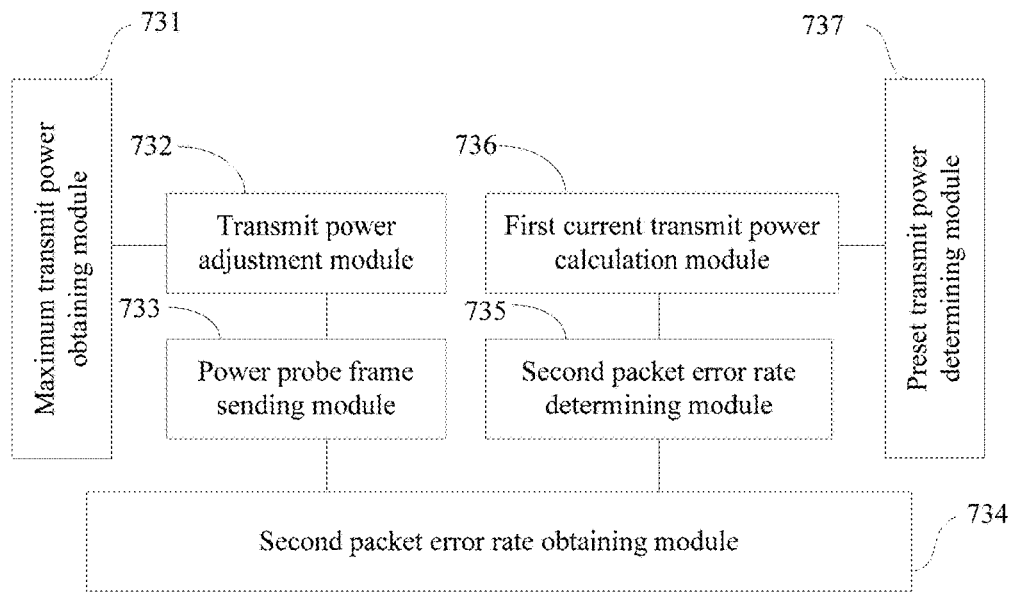
FIG. 14 is a schematic diagram of a preset transmit power calculation unit in FIG. 12.

In still another embodiment of the present invention, based on FIG. 12, as shown in FIG. 14, the preset transmit power calculation unit 73 of the transmit power control apparatus provided in this embodiment of the present invention includes a maximum transmit power obtaining module 731, a transmit power adjustment module 732, a power probe frame sending module 733, a second packet error rate obtaining module 734, a second packet error rate determining module 735, a first current transmit power calculation module 736, and a preset transmit power determining module 737.

The maximum transmit power obtaining unit 731 is configured to obtain a maximum transmit power when the mobile terminal sends data to the AP according to the RSSI and the data sending rate.

The transmit power adjustment module 732 is configured to adjust the current transmit power of the mobile terminal to the maximum transmit power.

The power probe frame sending module 733 is configured to send a power probe frame to the AP.

The second packet error rate obtaining module 734 is configured to obtain a second packet error rate generated when the terminal sends the power probe frame to the AP at the current transmit power.

The second packet error rate determining module 735 is configured to determine whether the second packet error rate is less than a preset attenuation trigger threshold.

The first current transmit power calculation module 736 is configured to: when the second packet error rate is less than the preset attenuation trigger threshold, subtract a preset power change step value from the current transmit power of the mobile terminal.

The preset transmit power determining module 737 is configured to: when the second packet error rate is not less than the preset attenuation trigger threshold, determine the current transmit power of the mobile terminal as the preset transmit power corresponding to both the RSSI and the data sending rate, and use the preset transmit power as the second target transmit power.

Figure 15:
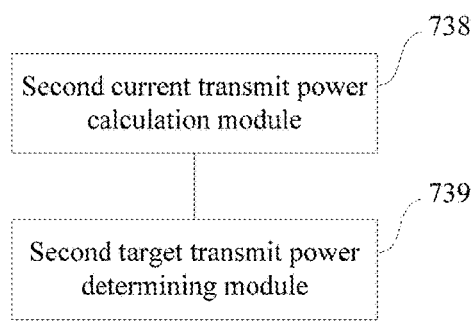
FIG. 15 is a schematic diagram of a transmit power control apparatus according to still another example embodiment.

In still another embodiment of the present invention, based on FIG. 14, as shown in FIG. 15, the transmit power control apparatus provided in this embodiment of the present invention may further include a second current transmit power calculation module 738 and a second target transmit power determining module 739.

The second packet error rate determining module 735 is further configured to: when the second packet error rate is not less than the preset attenuation trigger threshold, determine whether the second packet error rate is less than a preset attenuation stop threshold.

The second current transmit power calculation module 738 is configured to: when the second packet error rate is not less than the preset attenuation stop threshold, add the preset power change step value to the current transmit power of the mobile terminal, and use an obtained result as the second target transmit power.

The second target transmit power determining module 739 is configured to: when the second packet error rate is less than the preset attenuation stop threshold, use the current transmit power of the mobile terminal as the second target transmit power.

Figure 16:
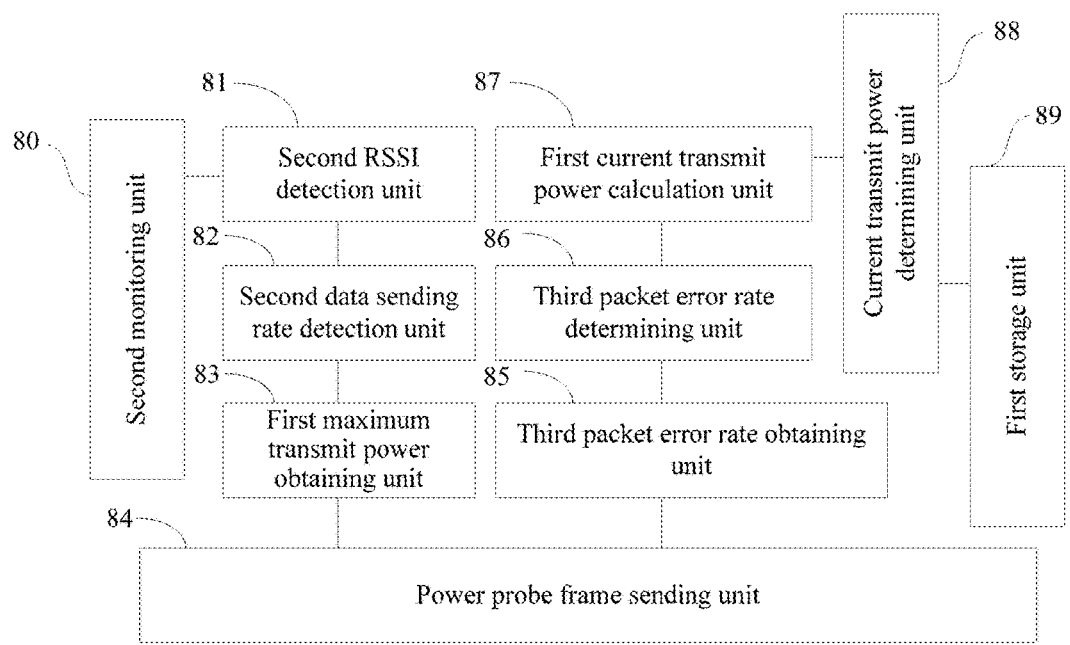
FIG. 16 is a schematic diagram of a transmit power control apparatus according to still another example embodiment.

Further, an embodiment of the present invention provides a transmit power control apparatus. The apparatus is located inside a mobile terminal. As shown in FIG. 16, the apparatus includes a second monitoring unit 80, a second RSSI detection unit 81, a second data sending rate detection unit 82, a first maximum transmit power obtaining unit 83, a power probe frame sending unit 84, a third packet error rate obtaining unit 85, a third packet error rate determining unit 86, a first current transmit power calculation unit 87, a current transmit power determining unit 88, and a first storage unit 89.

The second monitoring unit 80 is configured to monitor whether the mobile terminal has accessed a wireless access point AP.

The second RSSI detection unit 81 is configured to: when the mobile terminal has accessed the AP, detect a received signal strength indicator RSSI of a signal that is sent by the AP and received by the mobile terminal.

The second data sending rate detection unit 82 is configured to detect a data sending rate at which the mobile terminal sends data to the AP.

The first maximum transmit power obtaining unit 83 is configured to obtain a maximum transmit power when the mobile terminal sends data to the AP according to the RSSI and the data sending rate.

The power probe frame sending unit 84 is configured to control the mobile terminal to send a power probe frame to the AP at the maximum transmit power.

The third packet error rate obtaining unit 85 is configured to obtain a third packet error rate generated when the terminal sends the power probe frame to the AP at the current transmit power.

The third packet error rate determining unit 86 is configured to determine whether the third packet error rate is less than a preset attenuation trigger threshold.

The first current transmit power calculation unit 87 is configured to: when the third packet error rate is less than the preset attenuation trigger threshold, subtract a preset power change step value from the current transmit power of the mobile terminal.

The current transmit power determining unit 88 is configured to: when the third packet error rate is not less than the preset attenuation trigger threshold, determine the current transmit power of the mobile terminal as a preset transmit power corresponding to both the RSSI and the data sending rate.

The first storage unit 89 is configured to save the RSSI, the data transmission rate, and the corresponding preset transmit power into a transmit power relationship table.

Figure 17:
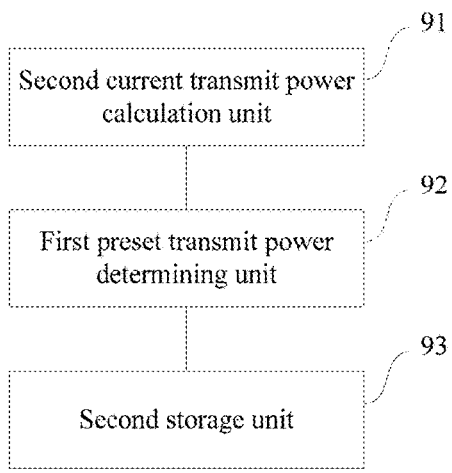
FIG. 17 is a schematic diagram of a transmit power control apparatus according to still another example embodiment.

In still another embodiment of the present invention, based on FIG. 16, as shown in FIG. 17, the transmit power control apparatus provided in this embodiment of the present invention may further include a second current transmit power calculation unit 91, a first preset transmit power determining unit 92, and a second storage unit 93.

The third packet error rate determining unit 86 is further configured to: when the third packet error rate is not less than the preset attenuation trigger threshold, determine whether the third packet error rate is less than a preset attenuation stop threshold.

The second current transmit power calculation unit 91 is configured to: when the third packet error rate is not less than the preset attenuation stop threshold, add the preset power change step value to the current transmit power of the mobile terminal, and determine an obtained result as the preset transmit power corresponding to both the RSSI and the data sending rate.

The first preset transmit power determining unit 92 is configured to: when the third packet error rate is less than the preset attenuation stop threshold, determine the current transmit power of the mobile terminal as the preset transmit power corresponding to both the RSSI and the data sending rate.

The second storage unit 93 is configured to save the RSSI, the data transmission rate, and the corresponding preset transmit power into the transmit power relationship table.

Figure 18:
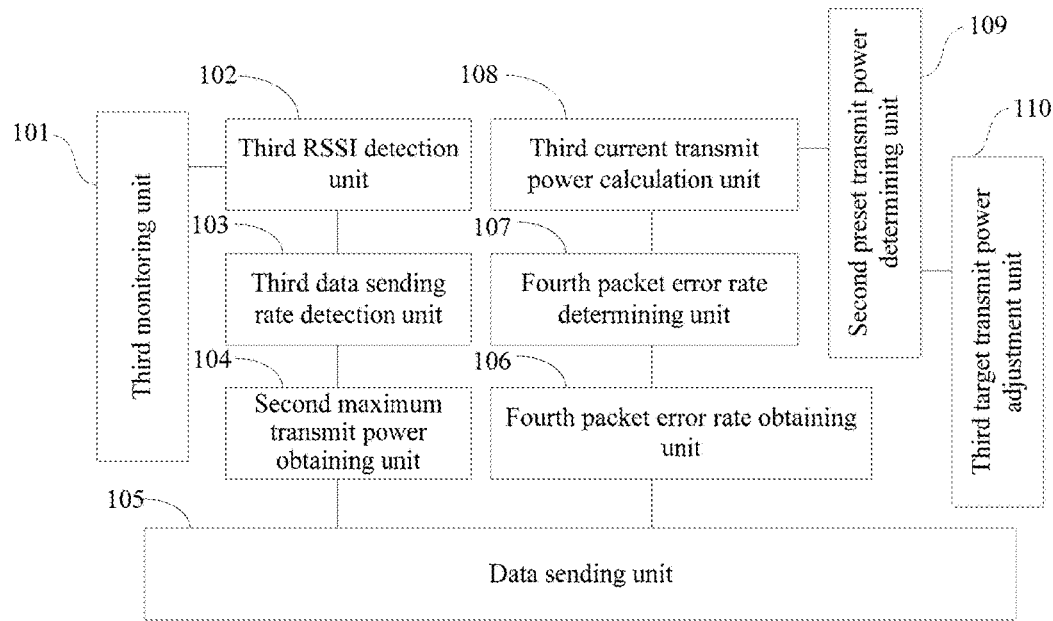
FIG. 18 is a schematic diagram of a transmit power control apparatus according to still another example embodiment.

Further, an embodiment of the present invention provides a transmit power control apparatus. The apparatus is located inside a mobile terminal. As shown in FIG. 18, the apparatus includes:

a third monitoring unit 101, configured to monitor whether the mobile terminal has accessed a wireless access point AP;

a third RSSI detection unit 102, configured to: when the mobile terminal has accessed the AP, detect a received signal strength indicator RSSI of a signal that is sent by the AP and received by the mobile terminal;

a third data sending rate detection unit 103, configured to detect a data sending rate at which the mobile terminal sends data to the AP;

a second maximum transmit power obtaining unit 104, configured to obtain a maximum transmit power when the mobile terminal sends data to the AP according to the RSSI and the data sending rate;

a data sending unit 105, configured to control the mobile terminal to send data to the AP at the maximum transmit power;

a fourth packet error rate obtaining unit 106, configured to obtain a fourth packet error rate generated when the terminal sends a power probe frame to the AP at the current transmit power;

a fourth packet error rate determining unit 107, configured to determine whether the fourth packet error rate is less than a preset attenuation trigger threshold;

a third current transmit power calculation unit 108, configured to: when the fourth packet error rate is less than the preset attenuation trigger threshold, subtract a preset power change step value from the current transmit power of the mobile terminal;

a second preset transmit power determining unit 109, configured to: when the fourth packet error rate is not less than the preset attenuation trigger threshold, determine the current transmit power of the mobile terminal as a preset transmit power corresponding to both the RSSI and the data sending rate, and use the preset transmit power as a third target transmit power; and a third target transmit power adjustment unit 110, configured to adjust the current transmit power of the mobile terminal to the third target transmit power.

Figure 19:
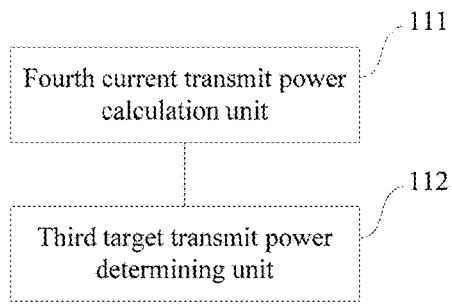
FIG. 19 is a schematic diagram of a transmit power control apparatus according to still another example embodiment.

In still another embodiment of the present invention, based on FIG. 18, as shown in FIG. 19, the transmit power control apparatus provided in this embodiment of the present invention may further include a fourth current transmit power calculation unit 111 and a third target transmit power determining unit 112.

The fourth packet error rate determining unit 107 is further configured to: when the fourth packet error rate is not less than the preset attenuation trigger threshold, determine whether the fourth packet error rate is less than a preset attenuation stop threshold.

The fourth current transmit power calculation unit 111 is configured to: when the fourth packet error rate is not less than the preset attenuation stop threshold, add the preset power change step value to the current transmit power of the mobile terminal, and use an obtained result as the third target transmit power.

The third target transmit power determining unit 112 is configured to: when the fourth packet error rate is less than the preset attenuation stop threshold, use the current transmit power of the mobile terminal as the third target transmit power.

The third target transmit power adjustment unit 110 is further configured to adjust the current transmit power of the mobile terminal to the third target transmit power.

For the apparatus in the foregoing embodiments, specific manners of executing operations by each module are described in detail in the embodiments related to the method, and details are not described herein.

A person skilled in the art can easily figure out another implementation solution of the present invention after considering the specification and practicing the present invention that is disclosed herein. This application is intended to cover any variations, functions, or adaptive changes of the present invention. These variations, functions, or adaptive changes comply with general principles of the present invention, and include common knowledge or a commonly used technical means in the technical field that is not disclosed in the present invention. The specification and the embodiments are merely considered as examples, and the actual scope and the spirit of the present invention are pointed out by the following claims.

It should be understood that the present invention is not limited to the accurate structures that are described in the foregoing and that are shown in the accompanying drawings, and modifications and changes may be made without departing from the scope of the present invention. The scope of the present invention is limited only by the appended claims.

What is claimed is:

1. A transmit power control method, applied to a mobile terminal, wherein the method comprises:
   monitoring, at the mobile terminal, whether the mobile terminal has accessed a wireless access point (AP);
   in response to determining from the monitoring that the mobile terminal has accessed the AP, adjusting, at the mobile terminal, a current transmit power of the mobile terminal, wherein adjusting includes:
      detecting a received signal strength indicator (RSSI) of a signal sent by the AP and received by the mobile terminal;
      detecting a data sending rate at which the mobile terminal sends data to the AP;
      determining a preset transmit power corresponding to both the RSSI and the data sending rate according to a pre-established transmit power relationship table, wherein in the transmit power relationship table, in the case of a same RSSI, each data sending rate corresponds to multiple preset transmit power;
      identifying the preset transmit power corresponding to the RSSI and the data sending rate as a first target transmit power; and
      adjusting the current transmit power of the mobile terminal to the first target transmit power, wherein the mobile terminal sends data to the AP according to the first target transmit power;
   obtaining a first packet error rate generated when the mobile terminal sends data to the AP at the first target transmit power;
   determining whether the first packet error rate is greater than a preset upper threshold; and
   in response to determining that the first packet error rate is greater than the preset upper threshold:
      obtaining a maximum transmit power when the mobile terminal sends data to the AP according to the RSSI and the data sending rate;
      adjusting the current transmit power of the mobile terminal to the maximum transmit power and sending a power probe frame to the AP;
      obtaining a second packet error rate generated when the mobile terminal sends the power probe frame to the AP at the current transmit power;
      determining whether the second packet error rate is less than a preset attenuation trigger threshold; and
      in response to determining that the second packet error rate is less than the preset attenuation trigger threshold:
         subtracting a preset power change step value from the current transmit power of the mobile terminal; and
         obtaining a second packet error rate generated when the mobile terminal sends the power probe frame to the AP at the current transmit power; or
      in response to determining that the second packet error rate is not less than the preset attenuation trigger threshold:
         determining the current transmit power of the mobile terminal as the preset transmit power corresponding to both the RSSI and the data sending rate;
         using the preset transmit power as a second target transmit power; and
      adjusting the current transmit power of the mobile terminal from the first target transmit power to the second target transmit power, wherein the mobile terminal sends data to the AP according to the second target transmit power.

2. The transmit power control method according to claim 1, further comprising:
   updating the transmit power relationship table.

3. The transmit power control method according to claim 1, further comprising:
   in response to determining that the second packet error rate is not less than the preset attenuation trigger threshold, determining whether the second packet error rate is less than a preset attenuation stop threshold;
   in response to determining that the second packet error rate is not less than the preset attenuation stop threshold:
      adding the preset power change step value to the current transmit power of the mobile terminal; and
      using an obtained result as the second target transmit power; and
   in response to determining that the second packet error rate is less than the preset attenuation stop threshold, using the current transmit power of the mobile terminal as the second target transmit power.

4. A transmit power control method, applied to a mobile terminal, comprising:
   monitoring whether the mobile terminal has accessed a wireless access point (AP);
   in response to determining from the monitoring that the mobile terminal has accessed the AP:
      detecting a received signal strength indicator (RSSI) of a signal that is sent by the AP and received by the mobile terminal; and
      detecting a data sending rate at which the mobile terminal sends data to the AP;
      obtaining a maximum transmit power when the mobile terminal sends data to the AP according to the RSSI and the data sending rate;
      controlling the mobile terminal to send a power probe frame to the AP at the maximum transmit power;
      obtaining a third packet error rate generated when the terminal sends the power probe frame to the AP at the current transmit power;
      determining whether the third packet error rate is less than a preset attenuation trigger threshold;
      in response to determining that the third packet error rate is less than the preset attenuation trigger threshold, performing one of:
         subtracting a preset power change step value from the current transmit power of the mobile terminal and obtaining a third packet error rate generated when the terminal sends the power probe frame to the AP at the current transmit power; or
      in response to determining that the third packet error rate is not less than the preset attenuation trigger threshold:
         determining the current transmit power of the mobile terminal as a preset transmit power corresponding to both the RSSI and the data sending rate; and
         saving the RSSI, the data sending rate, and the corresponding preset transmit power into a transmit power relationship table.

5. The transmit power control method according to claim 4, further comprising:
- in response to determining that the third packet error rate is not less than the preset attenuation trigger threshold, determining whether the third packet error rate is less than a preset attenuation stop threshold;
- in response to determining that the third packet error rate is not less than the preset attenuation stop threshold, adding the preset power change step value to the current transmit power of the mobile terminal and determining an obtained result as the preset transmit power corresponding to both the RSSI and the data sending rate; or
- in response to determining that the third packet error rate is less than the preset attenuation stop threshold:
  - determining the current transmit power of the mobile terminal as the preset transmit power corresponding to both the RSSI and the data sending rate; and
  - saving the RSSI, the data sending rate, and the corresponding preset transmit power into the transmit power relationship table.

6. A transmit power control method, applied to a mobile terminal, comprising:
- monitoring whether the mobile terminal has accessed a wireless access point (AP);
- in response to determining that the mobile terminal has accessed the AP:
  - detecting a received signal strength indicator (RSSI) of a signal that is sent by the AP and received by the mobile terminal;
  - detecting a data sending rate at which the mobile terminal sends data to the AP;
  - obtaining a maximum transmit power when the mobile terminal sends data to the AP according to the RSSI and the data sending rate;
  - controlling the mobile terminal to send data to the AP at the maximum transmit power;
  - obtaining a fourth packet error rate generated when the terminal sends a power probe frame to the AP at the current transmit power;
  - determining whether the fourth packet error rate is less than a preset attenuation trigger threshold;
  - in response to determining that the fourth packet error rate is less than the preset attenuation trigger threshold, subtracting a preset power change step value from the current transmit power of the mobile terminal and obtaining a fourth packet error rate generated when the terminal sends a power probe frame to the AP at the current transmit power; and
  - in response to determining that the fourth packet error rate is not less than the preset attenuation trigger threshold:
    - determining the current transmit power of the mobile terminal as a preset transmit power corresponding to both the RSSI and the data sending rate;
    - identifying the preset transmit power as a third target transmit power; and
    - adjusting the current transmit power of the mobile terminal to the third target transmit power, wherein the mobile terminal sends data to the AP according to the third target transmit power.

7. The transmit power control method according to claim 6, further comprising:
- in response to determining that the fourth packet error rate is not less than the preset attenuation trigger threshold, determining whether the fourth packet error rate is less than a preset attenuation stop threshold;
- in response to determining that the fourth packet error rate is not less than the preset attenuation stop threshold, adding the preset power change step value to the current transmit power of the mobile terminal and using an obtained result as the third target transmit power;
- in response to determining that the fourth packet error rate is less than the preset attenuation stop threshold, using the current transmit power of the mobile terminal as the third target transmit power; and
- adjusting the current transmit power of the mobile terminal to the third target transmit power, wherein the mobile terminal sends data to the AP according to the third target transmit power.

* * * * *